(12) United States Patent
Kadous et al.

(10) Patent No.: US 8,077,691 B2
(45) Date of Patent: *Dec. 13, 2011

(54) PILOT TRANSMISSION AND CHANNEL ESTIMATION FOR MISO AND MIMO RECEIVERS IN A MULTI-ANTENNA SYSTEM

(75) Inventors: Tamer Kadous, San Diego, CA (US); Avneesh Agrawal, San Diego, CA (US); Dhananjay Ashok Gore, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 649 days.

This patent is subject to a terminal disclaimer.

(21) Appl. No.: 11/020,888

(22) Filed: Dec. 22, 2004

(65) Prior Publication Data

US 2005/0195763 A1 Sep. 8, 2005

Related U.S. Application Data

(60) Provisional application No. 60/550,893, filed on Mar. 5, 2004.

(51) Int. Cl.
*H04B 7/208* (2006.01)
(52) U.S. Cl. .................. 370/344; 370/334; 370/345
(58) Field of Classification Search .................. 370/334, 370/344, 345
See application file for complete search history.

(56) References Cited

U.S. PATENT DOCUMENTS

| | | | |
|---|---|---|---|
| 6,690,665 B1 | 2/2004 | Choi et al. | |
| 6,711,412 B1 * | 3/2004 | Tellado et al. | 455/506 |
| 2002/0193146 A1 * | 12/2002 | Wallace et al. | 455/562 |
| 2003/0016637 A1 * | 1/2003 | Khayrallah et al. | 370/329 |
| 2003/0043732 A1 | 3/2003 | Walton et al. | |
| 2003/0043887 A1 * | 3/2003 | Hudson | 375/144 |
| 2004/0082356 A1 | 4/2004 | Walton et al. | |
| 2004/0085939 A1 | 5/2004 | Wallace et al. | 370/335 |
| 2004/0087324 A1 | 5/2004 | Ketchum et al. | 455/513 |
| 2004/0120411 A1 | 6/2004 | Walton et al. | 375/260 |

(Continued)

FOREIGN PATENT DOCUMENTS

EP 0923817 A1 6/1999

(Continued)

OTHER PUBLICATIONS

Written Opinion, PCT/US2005/006906, International Searching Authority, European Patent Office, Jun. 14, 2005.

(Continued)

*Primary Examiner* — Steven Lim
(74) *Attorney, Agent, or Firm* — Donald C. Kordich

(57) ABSTRACT

A transmitter generates multiple composite pilots with a training matrix and a gain matrix. Each composite pilot includes multiple training pilots generated with multiple columns of the training matrix and scaled with multiple gain elements in a column of the gain matrix. The transmitter transmits each composite pilot via multiple transmit antennas. A MISO receiver obtains received symbols for the multiple composite pilots and derives an estimate of a composite MISO channel. For OFDM, the MISO receiver derives an initial impulse response estimate for each composite pilot, filters the initial impulse response estimates for all composite pilots, and derives a frequency response estimate for the composite MISO channel. A MIMO receiver obtains and processes received symbols for the multiple composite pilots based on the training and gain matrices and derives channel estimates for individual SISO channels between the multiple transmit antennas and multiple receive antennas.

59 Claims, 8 Drawing Sheets

U.S. PATENT DOCUMENTS

| | | | |
|---|---|---|---|
| 2004/0179627 A1 | 9/2004 | Ketchum et al. | |
| 2004/0223561 A1* | 11/2004 | Tahat | 375/347 |
| 2005/0047515 A1* | 3/2005 | Walton et al. | 375/267 |
| 2005/0128953 A1* | 6/2005 | Wallace et al. | 370/241 |

FOREIGN PATENT DOCUMENTS

| | | |
|---|---|---|
| EP | 1249980 A2 | 10/2002 |
| EP | 1249980 A3 | 9/2003 |
| EP | 1357693 A1 | 10/2003 |
| WO | WO02080375 A2 | 10/2002 |

OTHER PUBLICATIONS

International Search Report, PCT/US2005/006906, International Search Authority, US, Jun. 14, 2005.

* cited by examiner

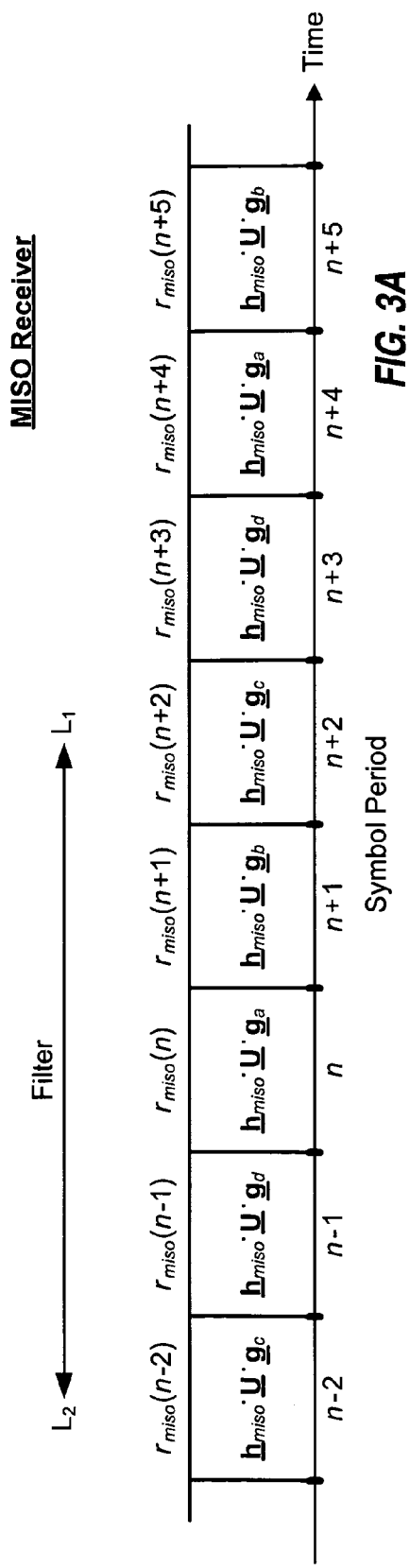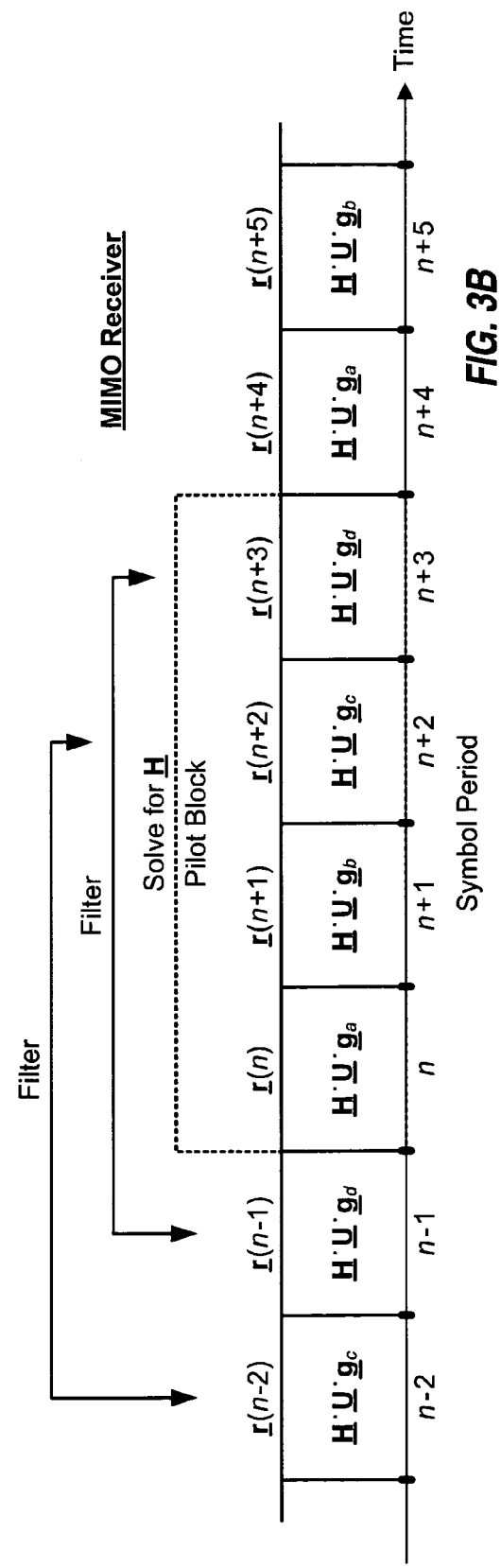

PILOT TRANSMISSION AND CHANNEL ESTIMATION FOR MISO AND MIMO RECEIVERS IN A MULTI-ANTENNA SYSTEM

CROSS-REFERENCE TO RELATED APPLICATIONS

The present application for patent claims priority to Provisional Application No. 60/550,893 entitled "Channel Estimation Using Pilot Overlapping for MISO/MIMO Multiplexing" filed Mar. 5, 2004, and assigned to the assignee hereof and hereby expressly incorporated by reference herein.

BACKGROUND

I. Field

The present invention relates generally to communication, and more specifically to pilot transmission and channel estimation in a wireless multi-antenna communication system.

II. Background

A multi-antenna communication system supports (1) multiple-input multiple-output (MIMO) transmission from multiple (T) transmit antennas to multiple (R) receive antennas and (2) multiple-input single-output (MISO) transmission from multiple transmit antennas to a single receive antenna. A MIMO channel formed by the T transmit antennas and R receive antennas is composed of S spatial channels, where $S \leq \min\{T, R\}$. The S spatial channels may be used to transmit data in parallel to achieve higher overall throughput and/or redundantly to achieve greater reliability. A MISO channel formed by the T transmit antennas and single receive antenna is composed of a single spatial channel. The T transmit antennas may be used to transmit data redundantly to achieve greater reliability.

An accurate estimate of a wireless channel between a transmitter and a receiver is normally needed in order to recover data sent via the wireless channel. Channel estimation is typically performed by sending a pilot from the transmitter and measuring the pilot at the receiver. The pilot is made up of symbols that are known a priori by both the transmitter and receiver. The receiver can thus estimate the channel response based on the received symbols and the known symbols.

The multi-antenna system may concurrently support both MISO receivers (which are receivers equipped with a single antenna) and MIMO receivers (which are receivers equipped with multiple antennas). MISO and MIMO receivers typically require different channel estimates and thus have different requirements for the pilot, as described below. Since pilot transmission represents overhead in the multi-antenna system, it is desirable to minimize pilot transmission to the extent possible. However, the pilot transmission should be such that both MISO and MIMO receivers can obtain channel estimates of sufficient quality.

There is therefore a need in the art for techniques to efficiently transmit a pilot in a multi-antenna system.

SUMMARY

Techniques for transmitting a pilot to support both MISO and MIMO receivers in a multi-antenna communication system and for performing channel estimation at these receivers are described herein. A transmitter generates multiple composite pilots with a training matrix and a gain matrix. Each composite pilot comprises multiple training pilots that are generated with multiple columns of the training matrix and further scaled with multiple gain elements in a column of the gain matrix. The training matrix may be an orthonormal matrix with orthogonal columns (e.g., a Walsh matrix or a Fourier matrix) or some other matrix. The gain matrix is formed such that the MISO and MIMO receivers can estimate their respective MISO and MIMO channels. The gain matrix also controls the amount of transmit power used for the training pilot sent for the MISO receiver and the training pilots sent for the MIMO receiver. The transmitter transmits each composite pilot from multiple (T) transmit antennas.

The MISO receiver obtains received symbols for the multiple composite pilots via a single receive antenna and processes (e.g., filters) these received symbols to obtain an estimate of a composite MISO channel between the T transmit antennas and the single receive antenna. For a multi-carrier system, the MISO receiver may derive an initial impulse response estimate for each composite pilot based on the received symbols obtained from multiple frequency subbands used for that composite pilot. The MISO receiver may then filter the initial impulse response estimates for the multiple composite pilots to obtain an impulse response estimate for the composite MISO channel. The MISO receiver may perform post-processing (e.g., thresholding and/or truncation) on this impulse response estimate and then derive a final frequency response estimate for the composite MISO channel based on the post-processed impulse response estimate.

The MIMO receiver obtains received symbols for the multiple composite pilots via multiple (R) receive antennas and processes these received symbols based on the training and gain matrices to obtain estimates of multiple single-input single-output (SISO) channels of the MIMO channel between the T transmit antennas and the R receive antennas. For a multi-carrier system, the MIMO receiver may derive an initial impulse response estimate for each combination of composite pilot and receive antenna based on the received symbols obtained from multiple frequency subbands used for that combination of composite pilot and receive antenna. The MIMO receiver may then process the initial impulse response estimates for all combinations of composite pilot and receive antenna based on the training and gain matrices to obtain impulse response estimates for the individual SISO channels. The MIMO receiver may then derive a final frequency response estimate for each SISO channel based on the impulse response estimate for that SISO channel.

The MISO and MIMO receivers may also perform channel estimation in other manners and/or using other channel estimation techniques, as described below. Various aspects and embodiments of the invention are also described in detail below.

BRIEF DESCRIPTION OF THE DRAWINGS

The features and nature of the present invention will become more apparent from the detailed description set forth below when taken in conjunction with the drawings in which like reference characters identify correspondingly throughout.

FIGS. 3A and 3B illustrate channel estimation performed by a MISO receiver and a MIMO receiver, respectively, for four composite pilots.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

1. Single-Carrier Multi-Antenna System

Figure 1:
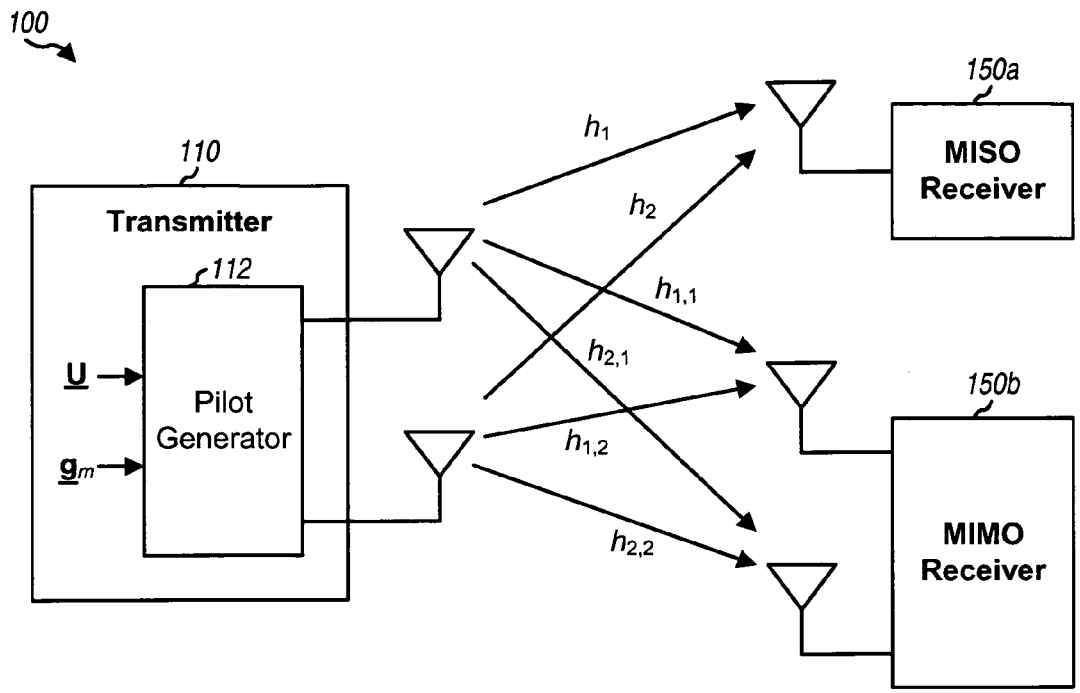
FIG. 1 shows a multi-antenna system with a transmitter and two receivers.

FIG. 1 shows a multi-antenna communication system 100 with a transmitter 110 and two receivers 150a and 150b. For simplicity, transmitter 110 has two transmit antennas, MISO receiver 150a has a single receive antenna, and MIMO receiver 150b has two receive antennas.

A MISO channel formed by the two antennas at the transmitter and the single antenna at the MISO receiver may be characterized by a 1×2 channel response row vector $\underline{h}_{1\times2}$. This vector may be expressed as:

$$\underline{h}_{1\times2} = [h_1\ h_2],\qquad\text{Eq (1)}$$

where entry $h_j$, for j=1, 2, denotes the complex channel gain between transmit antenna j and the single antenna at the MISO receiver. A vector is often expressed as a column, and a row vector is expressed as a row. A SISO channel exists between each transmit/receive antenna pair. The two entries in $\underline{h}_{1\times2}$ are indicative of the channel gains for the two SISO channels of the MISO channel.

A MIMO channel formed by the two antennas at the transmitter and the two antennas at the MIMO receiver may be characterized by a 2×2 channel response matrix $\underline{H}_{2\times2}$. This matrix may be expressed as:

$$\underline{H}_{2\times2} = \begin{bmatrix} h_{1,1} & h_{1,2} \\ h_{2,1} & h_{2,2} \end{bmatrix},\qquad\text{Eq (2)}$$

where entry $h_{i,j}$, for i=1, 2 and j=1, 2, denotes the complex channel gain between transmit antenna j and receive antenna i at the MIMO receiver. $\underline{H}_{2\times2}$ may also be viewed as containing one channel response row vector $\underline{h}_{1\times2,i}$ for each receive antenna i.

The transmitter transmits a pilot from the two transmit antennas to allow the MISO and MIMO receivers to estimate their respective MISO and MIMO channels. A pilot generator 112 at the transmitter may generate a composite pilot as follows:

$$\underline{x}_{2\times1,m} = \underline{U}_{2\times2}\cdot\underline{g}_{2\times1,m},\qquad\text{Eq (3)}$$

where $\underline{g}_{2\times1,m}$ is a 2×1 gain vector for composite pilot m;
$\underline{U}_{2\times2}$ is a 2×2 training matrix with two columns; and
$\underline{x}_{2\times1,m}$ is a 2×1 vector with two transmit symbols for composite pilot m.

For simplicity, modulation symbols of 1+j0 are used for the pilot and can thus be omitted from equation (3). A transmit symbol is a symbol that is transmitted from one antenna in one symbol period for the pilot. A symbol period refers to the time duration in which a transmit symbol is sent from an antenna.

The training matrix $\underline{U}_{2\times2}$ contains two vectors or columns that should be orthogonal to one other and is given as $\underline{U}_{2\times2}=[\underline{u}_{2\times1,a}\ \underline{u}_{2\times1,b}]$. Each vector $\underline{u}_{2\times1,m}$, for m=a, b, is called a training vector and used to generate a training pilot that is pointed in a specific spatial direction determined by the elements of $\underline{u}_{2\times1,m}$. The composite pilot includes two training pilots that are generated with the two training vectors $\underline{u}_{2\times1,a}$ and $\underline{u}_{2\times1,b}$. The gain vector $\underline{g}_{2\times1,m}$ contains two elements that determine the gains of the two training pilots. The two training pilots for the composite pilot are thus scaled, combined, and sent simultaneously from the two transmit antennas.

The transmitter generates two composite pilots with two different gain vectors $\underline{g}_{2\times1,a}$ and $\underline{g}_{2\times1,b}$. The transmitter sends the two composite pilots (e.g., in two symbol periods) to allow both the MISO and MIMO receivers to estimate their channels. As an example, the training matrix $\underline{U}_{2\times2}$ and the gain vectors $\underline{g}_{2\times1,a}$ and $\underline{g}_{2\times1,b}$ may be defined as:

$$\underline{U}_{2\times2} = \begin{bmatrix} 1 & 1 \\ 1 & -1 \end{bmatrix},\ \underline{g}_{2\times1,a} = \begin{bmatrix} 1 \\ \alpha \end{bmatrix},\ \text{and}\ \underline{g}_{2\times1,b} = \begin{bmatrix} 1 \\ -\alpha \end{bmatrix},\qquad\text{Eq (4)}$$

where α determines the amount of transmit power to use for the additional pilot for the MIMO receiver and is typically selected such that $1\geq\alpha\geq0$.

The received symbol at the MISO receiver for each composite pilot may be expressed as:

$$r_{1\times1,m} = \underline{h}_{1\times2}\cdot\underline{x}_{2\times1,m} + n_{1\times1,m} = \underline{h}_{1\times2}\cdot\underline{U}_{2\times2}\cdot\underline{g}_{2\times1,m} + n_{1\times1,m},$$
$$\text{for } m = a, b,\qquad\text{Eq (5)}$$

where $r_{1\times1,m}$ is a received symbol at the MISO receiver for composite pilot m; and
$n_{1\times1,m}$ is the noise at the MISO receiver for composite pilot m.

The two received symbols at the MISO receiver for the two composite pilots may be expressed in long form as follows:

$$r_{1\times1,a} = (h_1+h_2) + \alpha\cdot(h_1-h_2) + n_{1\times1,a},\text{ and}\qquad\text{Eq (6)}$$
$$r_{1\times1,b} = (h_1+h_2) - \alpha\cdot(h_1-h_2) + n_{1\times1,b}.$$

Equation (6) assumes that the MISO channel is constant over the two symbol periods in which the two composite pilots are sent.

The transmitter typically transmits data redundantly from both transmit antennas to the MISO receiver. In this case, the MISO receiver only needs to estimate a composite MISO channel, which is $h_{comp}=h_1+h_2$, and does not need to estimate the channel gains $h_1$ and $h_2$ for the individual SISO channels of the MISO channel. The MISO receiver may derive an estimate of the composite MISO channel as follows:

$$\hat{h}_{comp} = \frac{r_{1\times1,a}+r_{1\times1,b}}{2} = (h_1+h_2) + \frac{n_{1\times1,a}+n_{1\times1,b}}{2},\qquad\text{Eq (7)}$$

where $\hat{h}_{comp}$ is an estimate of $h_{comp}$.

The received symbols at the MIMO receiver for each composite pilot may be expressed as:

$$\underline{r}_{2\times1,m} = \underline{H}_{2\times2}\cdot\underline{x}_{2\times1,m} + \underline{n}_{2\times1,m} = \underline{H}_{2\times2}\cdot\underline{U}_{2\times2}\cdot\underline{g}_{2\times1,m} + \underline{n}_{2\times1,m},$$
$$\text{for } m = a, b,\qquad\text{Eq (8)}$$

where $\underline{r}_{2\times1,m} = [r_{1,m}\ r_{2,m}]^T$ is a 2×1 vector of received symbols for composite pilot m,
where "$T$" denotes a transpose; and
$\underline{n}_{2\times1,m} = [n_{1,m}\ n_{2,m}]^T$ is a noise vector at the MIMO receiver for composite pilot m.

The MIMO receiver obtains two vectors of received symbols, $\underline{r}_{2\times1,a}=[r_{1,a}\ r_{2,a}]^T$ and $\underline{r}_{2\times1,b}=[r_{1,b}\ r_{2,b}]^T$, for the two composite pilots generated with the two gain vectors $\underline{g}_{2\times1,a}$ and $\underline{g}_{2\times1,b}$, respectively.

The four received symbols at the MIMO receiver for the two composite pilots may be expressed in long form as follows:

$$r_{1,a}=(h_{1,1}+h_{1,2})+\alpha\cdot(h_{1,1}-h_{1,2})+n_{1,a}, \quad \text{Eq (9)}$$

$$r_{2,a}=(h_{2,1}+h_{2,2})+\alpha\cdot(h_{2,1}-h_{2,2})+n_{2,a},$$

$$r_{1,b}=(h_{1,1}+h_{1,2})-\alpha\cdot(h_{1,1}-h_{1,2})+n_{1,b}, \text{ and}$$

$$r_{2,b}=(h_{2,1}+h_{2,2})-\alpha\cdot(h_{2,1}-h_{2,2})+n_{2,b}.$$

Equation (9) assumes that the MIMO channel is constant over the two symbol periods in which the two composite pilots are sent.

The transmitter may transmit data in parallel from both transmit antennas to the MIMO receiver to improve throughput. In this case, the MIMO receiver typically needs to (1) estimate the channel gains $h_{1,1}$, $h_{1,2}$, $h_{2,1}$ and $h_{2,2}$ for the individual SISO channels of the MIMO channel and (2) use these channel gain estimates to recover the data transmission from the transmitter. The MIMO receiver may derive an estimate of the individual SISO channels as follows:

$$\hat{h}_{1,1} = \frac{r_{1,a}+r_{1,b}}{4} + \frac{r_{1,a}-r_{1,b}}{4\alpha} = h_{1,1}+n_{1,1}, \quad \text{Eq (10)}$$

$$\hat{h}_{1,2} = \frac{r_{1,a}+r_{1,b}}{4} - \frac{r_{1,a}-r_{1,b}}{4\alpha} = h_{1,2}+n_{1,2},$$

$$\hat{h}_{2,1} = \frac{r_{2,a}+r_{2,b}}{4} + \frac{r_{2,a}-r_{2,b}}{4\alpha} = h_{2,1}+n_{2,1}, \text{ and}$$

$$\hat{h}_{2,2} = \frac{r_{2,a}+r_{2,b}}{4} - \frac{r_{2,a}-r_{2,b}}{4\alpha} = h_{2,2}+n_{2,2},$$

where $n_{1,1}$, $n_{1,2}$, $n_{2,1}$ and $n_{2,2}$ are the noise observed by the channel gain estimates $\hat{h}_{1,1}$, $\hat{h}_{1,2}$, $\hat{h}_{2,1}$ and $\hat{h}_{2,2}$, respectively.

The description above is for a 2×2 system in which the transmitter has two transmit antennas and the receivers have at most two receive antennas. In general, a multi-antenna system may include transmitters and receivers with any number of antennas, so that T and R may be any integer values.

For an R×T system, a transmitter generates T composite pilots with T gain vectors, one gain vector for each composite pilot. Each composite pilot may be generated as follows:

$$\underline{x}_m = \underline{U}\cdot\underline{g}, \text{ for } m=a,b,\ldots,T, \quad \text{Eq (11)}$$

where $\underline{g}$ is a T×1 gain vector for composite pilot m;
U is a T×T training matrix with T columns; and
$\underline{x}_m$ is a T×1 vector with T transmit symbols for composite pilot m.

The matrix U contains T (preferably orthogonal) training vectors and is given as $\underline{U}=[\underline{u}_a\ \underline{u}_b\ \ldots\ \underline{u}_T]$. Each training vector contains T elements for the T transmit antennas and points in a different spatial direction. Each composite pilot includes T training pilots that are generated with the T training vectors in U. The T training pilots for each composite pilot are scaled by T gain elements in the gain vector $\underline{g}_m$ and then added together. T different gain vectors are used for the T composite pilots and are given as $\underline{G}=[\underline{g}_a\ \underline{g}_b\ \ldots\ \underline{g}_T]$. The gain vectors are appropriately selected to facilitate channel estimation by both the MISO and MIMO receivers. The transmitter transmits the T composite pilots, e.g., in T symbol periods.

The MISO receiver obtains T received symbols for the T composite pilots, which may be expressed as:

$$\underline{r}_{miso}=\underline{h}_{miso}\cdot\underline{U}\cdot\underline{G}+\underline{n}_{miso}, \quad \text{Eq (12)}$$

where $\underline{r}_{miso}$ is a 1×T row vector with T received symbols for the T composite pilots;
$\underline{h}_{miso}$ is a 1×T channel response row vector for the MISO receiver; and
$\underline{n}_{miso}$ is a 1×T noise row vector at the MISO receiver for the T composite pilots.

The received symbol row vector is given as $\underline{r}_{miso}=[r_{miso,a}\ r_{miso,b}\ \ldots\ r_{miso,T}]$, where $r_{miso,m}$ for $m=a \ldots T$ is the received symbol for composite pilot m.

The MISO receiver typically only needs to estimate the composite MISO channel, which is $h_{miso}=h_1+h_2+\ldots+h_T$, and not the individual SISO channels of the MISO channel. If the T gain vectors are appropriately selected, then the MISO receiver may derive an estimate of the composite MISO channel by simply filtering (e.g., averaging) the T received symbols for the T composite pilots, as follows:

$$\hat{h}_{miso} = \frac{r_{miso,a}+r_{miso,b}+\ldots+r_{miso,T}}{T} \quad \text{Eq (13)}$$

$$= h_1 + h_2 + \ldots + h_T + n_{miso},$$

where $\hat{h}_{miso}$ is an estimate of $h_{miso}$ and $n_{miso}$ is the noise observed by $h_{miso}$. The MISO receiver may also derive the composite MISO channel estimate by filtering the received symbols with other filters having different coefficients, as described below.

The MIMO receiver obtains T vectors of received symbols for the T composite pilots, which may be expressed as:

$$\underline{R}=\underline{H}\cdot\underline{U}\cdot\underline{G}+\underline{N}, \quad \text{Eq (14)}$$

where R is an R×T matrix with T vectors of received symbols for the T composite pilots;
H is an R×T channel response matrix for the MIMO receiver; and
N is an R×T noise matrix at the MIMO receiver for the T composite pilots.

The received symbol matrix is given as $\underline{R}=[\underline{r}_a\ \underline{r}_b\ \ldots\ \underline{r}_T]$, where $\underline{r}_m$ for $m=a \ldots T$ is a vector with R received symbols obtained via the R receive antennas for composite pilot m.

The MIMO receiver may derive an estimate of the MIMO channel response matrix as follows:

$$\hat{\underline{H}}=\underline{R}\cdot\underline{G}^{-1}\cdot\underline{U}^{-1}=(\underline{H}\cdot\underline{U}\cdot\underline{G}+\underline{N})\cdot\underline{G}^{-1}\cdot\underline{U}^{-1}=\underline{H}+\underline{\tilde{N}}, \quad \text{Eq (15)}$$

where $\hat{H}$ is an estimate of H and $\tilde{N}$ is the noise observed by H. The estimated channel response matrix $\hat{H}$ may also be obtained by performing some other linear operation on the received symbol matrix R.

The training matrix U is defined to achieve good channel estimation performance for both MISO and MIMO receivers. The training pilot generated with the first training vector $\underline{u}_a$ in U may be considered as a MISO pilot sent for the MISO receiver. The remaining T-1 training pilots generated with the last T-1 training vectors $\underline{u}_b$ through $\underline{u}_T$ in U may be considered as an additional pilot sent for the MIMO receiver. The MISO pilot may be considered to be more important, e.g., if the transmitter supports multiple MISO receivers. The additional pilot for the MIMO receiver may be considered to be less important and should not degrade the channel estimation performance of the MISO receiver(s). The use of the training matrix U and the gain matrix G allow for pilot transmission that favors one spatial direction for the MISO receiver while also supporting the MIMO receiver.

The best performance for channel estimation may be achieved when U is an orthonormal matrix and the T training vectors in U are orthogonal to one another and have unit power. This orthonormal condition may be expressed as: $U^H \cdot U = I$, where I is the identity matrix and "$^H$" denotes a conjugate transpose. The orthonormal condition may equivalently be expressed as: $u_m^H \cdot u_m = 1$ for m=a ... T and $u_m^H \cdot u_l = 0$, for l=a ... T, m=a ... T, and l≠m. The orthogonal training vectors allow the MISO receiver to average out the additional pilot sent for the MIMO receiver so that the MISO channel estimate is minimally degraded by the additional pilot. The T training vectors in U pointing in different spatial directions allow the MIMO receiver to estimate the channel gains of the individual SISO channels of the MIMO channel, or the R·T elements of the channel response matrix H. The training matrix may be formed in various manners.

In an embodiment, the training matrix U is a Walsh matrix W. A 2×2 Walsh matrix $W_{2 \times 2}$ is equal to $U_{2 \times 2}$ shown in equation (4). A larger size Walsh matrix $W_{2N \times 2N}$ may be formed from a smaller size Walsh matrix $W_{N \times N}$, as follows:

$$\underline{W}_{2N \times 2N} = \begin{bmatrix} \underline{W}_{N \times N} & \underline{W}_{N \times N} \\ \underline{W}_{N \times N} & -\underline{W}_{N \times N} \end{bmatrix}. \qquad \text{Eq (16)}$$

Walsh matrices have square dimensions that are powers of two.

In another embodiment, the training matrix U is a Fourier matrix F. A T×T Fourier matrix F has element $f_{l,n}$ in the l-th row of the n-th column, which may be expressed as:

$$f_{l,n} = e^{-j2\pi \frac{(l-1)(n-1)}{T}}, \text{ for } l = 1 \ldots T \text{ and } n = 1 \ldots T. \qquad \text{Eq (17)}$$

The terms "l-1" and "n-1" (instead of simply "l" and "n") in the exponent in equation (17) are due to an indexing scheme that starts with 1 instead of 0. Fourier matrices of any square dimension (e.g., 2×2, 3×3, 4×4, and so on) may be formed.

Each composite pilot comprises T training pilots that are generated with the T training vectors in U. The gain vector $g_m$ for each composite pilot determines the amount of transmit power to use for the MISO pilot and the additional pilot. The T gain vectors for the T composite pilots are also selected such that (1) the MISO receiver can estimate the composite MISO channel response with minimal degradation from the additional pilot and (2) the MIMO receiver can estimate the individual SISO channels. In an embodiment, the gain matrix G is formed by multiplying the last T-1 rows of an orthonormal matrix with the gain α. This gain α determines the amount of transmit power to use for the additional pilot for the MIMO receiver. In another embodiment, the gain matrix G is set to a diagonal matrix with T non-zero elements along the diagonal and zeros elsewhere. The T diagonal elements of G may be selected, for example, as $\{1, \alpha, \alpha, \ldots, \alpha\}$. This diagonal gain matrix results in the T training pilots being transmitted separately, with the first training pilot being transmitted at unit power and each remaining training pilot being transmitted at a power of $\alpha^2$. In general, the gain matrix G is defined such that the MISO receiver can derive a composite MISO channel estimate and the MIMO receiver can derive individual SISO channel estimates. Different gain matrices result in different pilot characteristics and hence different channel estimation performance.

Figure 2:
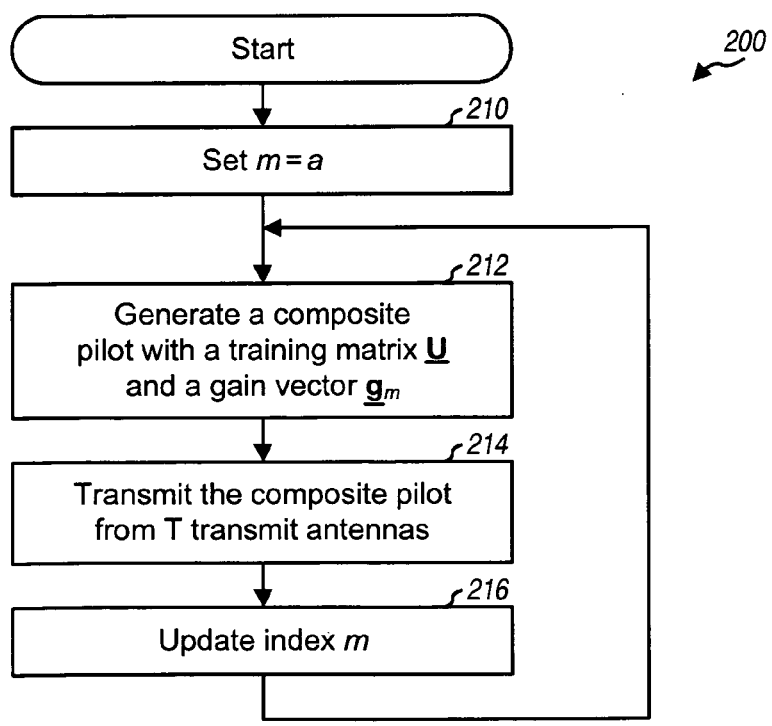
FIG. 2 shows a process for transmitting a pilot in the multi-antenna system.

FIG. 2 shows a process 200 for transmitting a pilot for MISO and MIMO receivers in the multi-antenna system. Initially, the index m is set to the first value a for this index (block 210). The transmitter generates composite pilot m with the training matrix U and the gain vector $g_m$, e.g., as shown in equation (11) (block 212). The transmitter then transmits composite pilot m from T transmit antennas, e.g., in one symbol period (block 214). The index m is then updated, e.g., set to the next value in the set {a, b, ... T} or set to the first value a after reaching the last value in the set (block 216). The process then returns to block 212 to generate and transmit another composite pilot.

As an example for an R×4 system with four transmit antennas, a training matrix $U_{4 \times 4}$ and a gain matrix $G_{4 \times 4}$ may be expressed as:

$$\underline{U}_{4 \times 4} = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \text{ and} \qquad \text{Eq (18)}$$

$$\underline{G}_{4 \times 4} = \begin{bmatrix} 1 & 1 & 1 & 1 \\ \alpha & -\alpha & \alpha & -\alpha \\ \alpha & \alpha & -\alpha & -\alpha \\ \alpha & -\alpha & -\alpha & \alpha \end{bmatrix}.$$

The matrix $U_{4 \times 4}$ is a 4×4 Walsh matrix and contains four training vectors, or $U_{4 \times 4} = [u_a \ u_b \ u_c \ u_d]$. The matrix $G_{4 \times 4}$ is formed based on the 4×4 Walsh matrix and contains four gain vectors, or $G_{4 \times 4} = [g_a \ g_b \ g_c \ g_d]$.

The transmitter may cycle through the four gain vectors in $G_{4 \times 4}$ and transmit four composite pilots in four symbol periods. For example, the transmitter may transmit the first composite pilot generated with $g_a$ in symbol period n, then the second composite pilot generated with $g_b$ in symbol period n+1, then the third composite pilot generated with $g_c$ in symbol period n+2, then the fourth composite pilot generated with $g_d$ in symbol period n+3, then the first composite pilot in symbol period n+4, and so on.

FIG. 3A illustrates channel estimation by the MISO receiver in the R×4 system. The transmitter transmits the pilot by using the training matrix $U_{4 \times 4}$ and by cycling through the four gain vectors in $G_{4 \times 4}$, as described above. The received symbols for the MISO receiver are $r_{miso}(n) = h_{miso} \cdot U \cdot g_a + n_{miso}$ for symbol period n, $r_{miso}(n+1) = h_{miso} \cdot U \cdot g_b + n_{miso}$ for symbol period n+1, and so on, as shown in FIG. 3A where the 4×4 subscript on $U_{4 \times 4}$ is omitted for clarity. The MISO receiver may filter the received symbols using, for example, a finite impulse response (FIR) filter, to obtain a composite MISO channel estimate $\hat{h}_{miso}$ at symbol period n, as follows:

$$\hat{h}_{miso}(n) = \sum_{i=-L_1}^{L_2} c(i) \cdot r_{miso}(n-i), \qquad \text{Eq (19)}$$

where c(i) for $i = -L_1 \ldots L_2$ are coefficients for the FIR filter; and $L_1$ and $L_2$ are the time extent of the FIR filter.

For a causal FIR filter, $L_1 = 0$, $L_2 \geq 1$, and the composite MISO channel estimate $\hat{h}_{miso}$ is a weighted sum of the received symbols for $L_2$ prior symbol periods and the current symbol period. For a non-causal FIR filter, $L_1 \geq 1$, $L_2 \geq 1$, and the composite MISO channel estimate $\hat{h}_{miso}$ is a weighted sum of the received symbols for $L_2$ prior symbol periods, the current symbol period, and $L_1$ future symbol periods. $L_1$ received symbols are buffered to implement the non-causal FIR filter.

FIG. 3B illustrates channel estimation by the MIMO receiver in the R×4 system. The transmitter transmits the pilot using the training matrix $U_{4\times4}$ and the gain matrix $G_{4\times4}$ as described above. The received symbols for the MIMO receiver are $r(n)=H\cdot U\cdot \underline{g}_a+n$ for symbol period n, $r(n+1)=H\cdot U\cdot \underline{g}_a+n$ for symbol period n+1, and so on, as shown in FIG. 3B. A pilot block is the smallest span in which all T composite pilots are transmitted. For the example shown in FIG. 3B, a pilot block is four symbol periods. The MIMO receiver can filter the received symbols for the same composite pilot, e.g., filter $r(n-2)$ and $r(n+2)$ for the composite pilot generated with $\underline{g}_c$, filter $r(n-1)$ and $r(n+3)$ for the composite pilot generated with $\underline{g}_d$, and so on. The MIMO receiver can also derive the individual SISO channel gain estimates based on the (filtered or unfiltered) received symbols obtained for one pilot block, as shown in FIG. 3B. For example, a matrix $\underline{R}$ may be formed with the four received symbol vectors $\underline{r}(n)$ through $\underline{r}(n+3)$, and the channel gain estimates may be computed on $\underline{R}$ as shown in equation (15).

For simplicity, FIGS. 3A and 3B show the MISO and MIMO channels being static for the entire time duration from symbol periods n−2 through n+5. For improved channel estimation performance, the pilot block should be shorter than the coherence time of the MISO and MIMO channels. The coherence time is the time duration in which the wireless channel is expected to remain approximately constant.

The concept described above in FIGS. 3A and 3B for the R×4 system may be extended to any R×T system. The training matrix $\underline{U}$ and the gain matrix $\underline{G}$ may be formed as described above. The transmitter generates T composite pilots with $\underline{U}$ and the T gain vectors in $\underline{G}$ and transmits these T composite pilots to the MISO and MIMO receivers. The MISO and MIMO receivers can estimate their MISO and MIMO channels, respectively, based on the received symbols for the T composite pilots.

2. Multi-Carrier Multi-Antenna System

A multi-antenna system may utilize multiple carriers for data and pilot transmission. Multiple carriers may be provided by OFDM, some other multi-carrier modulation techniques, or some other construct. OFDM effectively partitions the overall system bandwidth (W MHz) into multiple (K) orthogonal frequency subbands. These subbands are also called tones, subcarriers, bins, and frequency channels. With OFDM, each subband is associated with a respective subcarrier that may be modulated with data. A multi-antenna OFDM system may use only a subset of the K total subbands for data and pilot transmission, and the remaining subbands may serve as guard subbands to allow the system to meet spectral mask requirements. For simplicity, the following description assumes that all K subbands are usable for data and/or pilot transmission.

A wireless channel between a transmitter and a receiver in the multi-antenna OFDM system may experience frequency selective fading, which is characterized by a frequency response that varies across the system bandwidth. The K subbands for each SISO channel may then be associated with different complex channel gains. An accurate channel estimate for all K subbands may be needed in order to recover a data transmission on some or all of these subbands.

A MISO channel for a MISO receiver in the multi-antenna OFDM system may be characterized by a set of K channel response row vectors $\underline{h}_{miso}(k)$ for $k=1 \ldots K$. Each row vector $\underline{h}_{miso}(k)$ has dimensions of 1×T and contains T elements for the channel gains between the T transmit antennas and the single receive antenna for one subband k. A MIMO channel for a MIMO receiver in the multi-antenna OFDM system may be characterized by a set of K channel response matrices $\underline{H}(k)$ for $k=1 \ldots K$. Each matrix $\underline{H}(k)$ has dimensions of R×T and contains R·T elements for the channel gains between the T transmit antennas and the R receive antennas for one subband k.

The channel response for each SISO channel may be characterized by either a time-domain channel impulse response or a corresponding frequency-domain channel frequency response. The channel frequency response is the discrete Fourier transform (DFT) of the channel impulse response. The channel impulse response for each SISO channel may be characterized by L time-domain channel taps, where L is typically much less than the total number of subbands, or L<K. That is, if an impulse is applied at a transmit antenna, then L time-domain samples at a sample rate of W MHz taken at a receive antenna for this impulse stimulus would be sufficient to characterize the response of the SISO channel. The required number of channel taps (L) for the channel impulse response is dependent on the delay spread of the system, which is the time difference between the earliest and latest arriving signal instances of sufficient energy at the receiver. Because only L channel taps are needed for the channel impulse response, the frequency response for each SISO channel may be fully characterized based on channel gain estimates for as few as L appropriately selected subbands, instead of all K total subbands.

Figure 4:
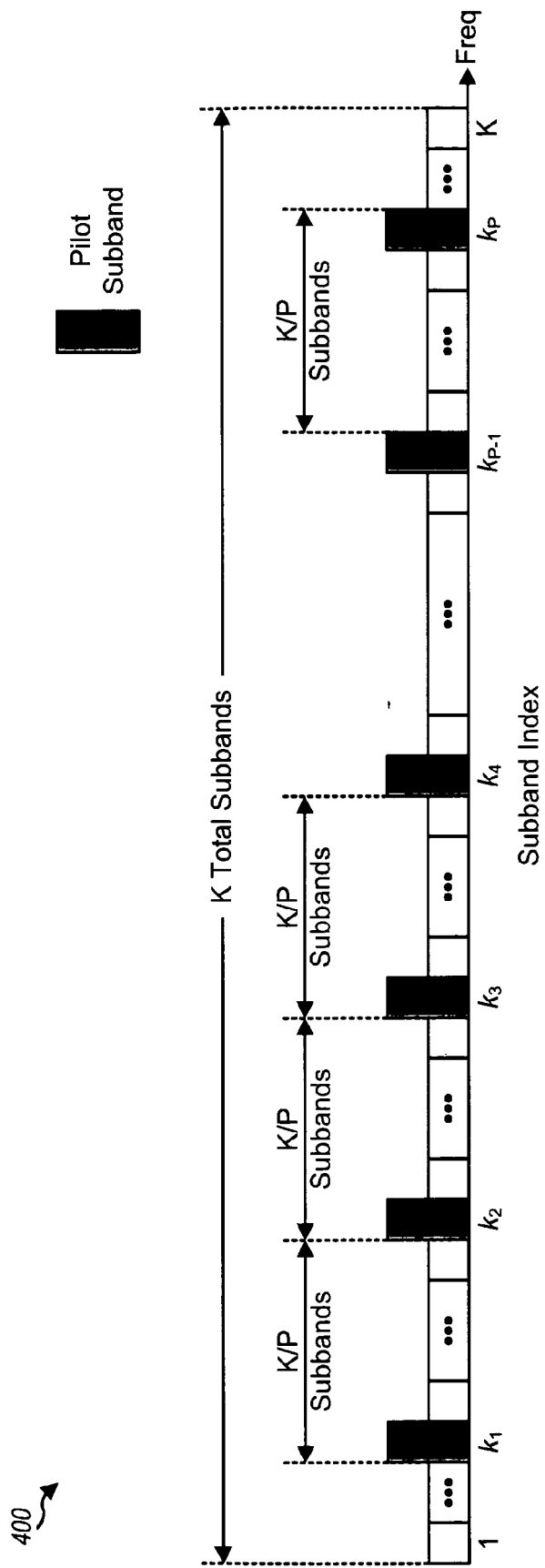
FIG. 4 shows a subband structure for a multi-antenna OFDM system.

FIG. 4 shows a subband structure 400 that may be used for pilot transmission in the multi-antenna OFDM system. A transmit symbol is sent on each of P pilot subbands, which are subbands used for pilot transmission, where typically K>P≧L. For improved performance and simplified receiver processing, the P pilot subbands may be uniformly distributed across the K total subbands such that consecutive pilot subbands are spaced apart by K/P subbands. The remaining K−P subbands may be used for data transmission and are called data subbands.

Figure 5:
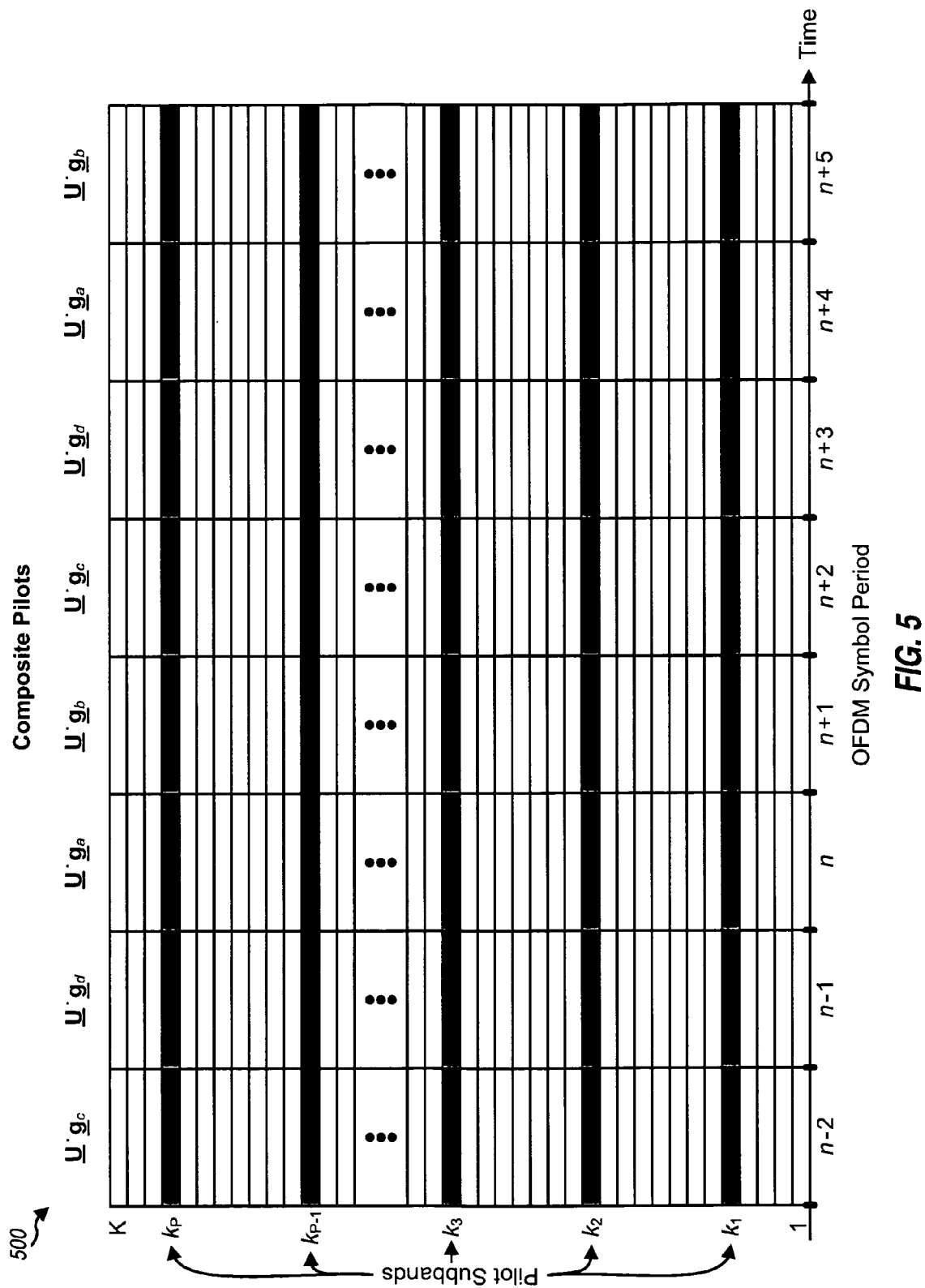
FIG. 5 shows an exemplary pilot transmission scheme.

FIG. 5 shows an exemplary pilot transmission scheme 500 for the multi-antenna OFDM system. For simplicity, FIG. 5 shows pilot transmission for an R×4 OFDM system with four transmit antennas. For this pilot transmission scheme, the transmitter cycles through the four gain vectors in $\underline{G}_{4\times4}$ and uses one gain vector $\underline{g}_m$ in each OFDM symbol period (or simply, each "symbol period"). The same training matrix $\underline{U}$ and the same gain vector $\underline{g}_m$ may be used for each of the P pilot subbands. The composite pilot for each subband may be generated as shown in equation (11).

The T composite pilots for an R×T OFDM system may also be transmitted in other manners. In another pilot transmission scheme, the T composite pilots generated with gain vectors $\underline{g}_a$ through $\underline{g}_T$ are transmitted on T different sets of pilot subbands in one symbol period. In yet another pilot transmission scheme, the composite pilot generated with gain vector $\underline{g}_a$ for the MISO receiver is transmitted on a first set of P pilot subbands (e.g., in each symbol period), and the T-1 additional composite pilots for the MIMO receiver are transmitted on a second set of P pilot subbands (e.g., by cycling through gain vectors $\underline{g}_b$ through $\underline{g}_T$ in T-1 symbol periods). In yet another pilot transmission scheme, the T composite pilots are transmitted on different sets of P pilot subbands in different symbol periods. This staggered pilot allows the MISO and MIMO receivers to obtain pilot observations for more than P subbands without increasing the number of subbands used for pilot transmission in any one symbol period. In general, the T composite pilots may be transmitted on any number of subband sets and any number of symbol periods. Each subband set may include any number of pilot subbands, and the different sets may have the same or different numbers of pilot subbands. The pilot subbands in each set may be uniformly distributed across the K total subbands.

For all pilot transmission schemes, the MISO and MIMO receivers may derive frequency response estimates for the composite MISO channel and the individual SISO channels, respectively, based on their received symbols and using various channel estimation techniques. For clarity, channel estimation using a direct least-squares estimation technique is described below.

Figure 6:
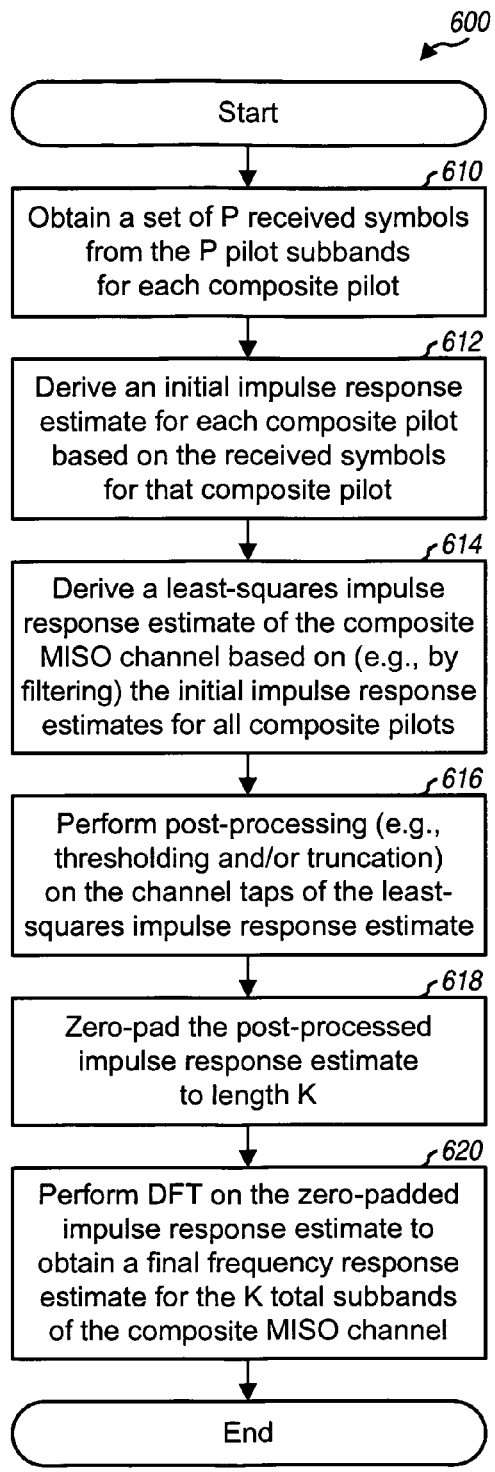
FIG. 6 shows a channel estimation process for a MISO receiver.

FIG. 6 shows a process 600 performed by the MISO receiver for channel estimation in the multi-carrier OFDM system. The MISO receiver obtains a set of P received symbols from the P pilot subbands for each composite pilot, which is a P×1 vector $\underline{r}_{miso,m} = [r_{miso,m}(k_1) \ r_{miso,m}(k_2) \ldots r_{miso,m}(k_P)]^T$ (block 610). The MISO receiver performs a P-point IDFT (or IFFT) on each set of P received symbols and derives an initial impulse response estimate for the corresponding composite pilot, which is a P×1 vector $\underline{h}_{miso}^{init}$ (block 612). The MISO receiver then filters the initial impulse response estimates for all T composite pilots to derive a least-squares impulse response estimate of the composite MISO channel, which is a P×1 vector $\underline{h}_{miso}^{ls}$ (block 614). $\underline{h}_{miso}^{ls}$ contains P channel taps, and the filtering is performed for each channel tap. The MISO receiver may then perform post-processing on the P channel taps of $\underline{h}_{miso}^{ls}$ (block 616). This post-processing may include, for example, (1) thresholding to set channel taps with magnitudes less than a predetermined threshold to zero and/or (2) truncation to set the last P-L channel taps in $\underline{h}_{miso}^{ls}$ to zero. The post-processed vector is then zero-padded to length K to obtain a zero-padded impulse response estimate $\underline{h}_{miso,K}^{ls}$ (block 618).

The MISO receiver then performs a K-point DFT (or FFT) on the K elements of $\underline{h}_{miso,K}^{ls}$ to obtain a final frequency response estimate for all K subbands of the composite MISO channel, which is a K×1 vector $\underline{\hat{h}}_{miso}$ (block 620). $\underline{\hat{h}}_{miso}$ contains K channel gain estimates for the K total subbands. The MISO receiver may perform filtering on the received symbols $\underline{r}_{miso,m}$, the initial impulse response estimate $\underline{h}_{miso}^{init}$, the least-squares impulse response estimate $\underline{h}_{miso}^{ls}$, and/or the final frequency response estimate $\underline{\hat{h}}_{miso}$ (e.g., obtained for multiple OFDM symbol periods) to derive a higher quality MISO channel estimate.

Alternatively, the MISO receiver may filter the received symbols for each pilot subband and derive an initial frequency response estimate $\underline{h}_{miso}^{init}$ for the P pilot subbands of the composite MISO channel. The MISO receiver may then process this initial frequency response estimate using the direct least-squares estimation technique (e.g., transform to the time domain, post-process, zero-pad, and transform back to the frequency domain) to obtain the final frequency response estimate $\underline{\hat{h}}_{miso}$ for the composite MISO channel. The MIMO receiver may thus perform filtering on the time-domain channel taps, as described above in FIG. 6, or on the frequency-domain received symbols. The time-domain processing in FIG. 6 is more suitable for pilot transmission schemes that transmit the T composite pilots on different sets of pilot subbands.

Figure 7:
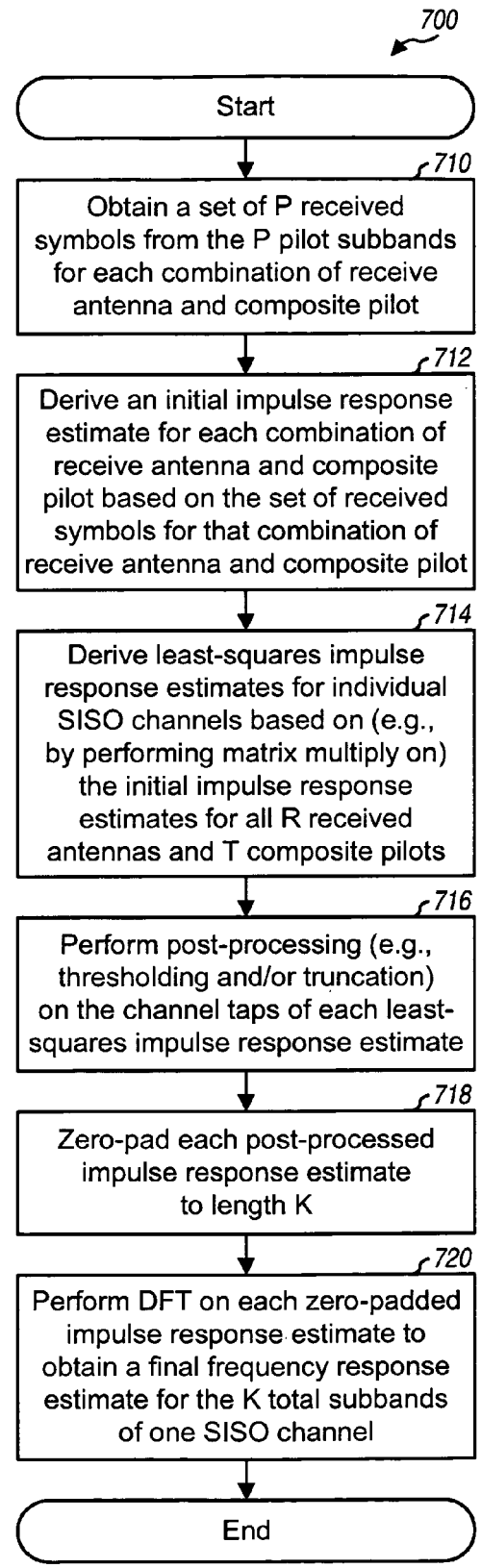
FIG. 7 shows a channel estimation process for a MIMO receiver.

FIG. 7 shows a process 700 performed by the MIMO receiver for channel estimation in the multi-carrier OFDM system. The MIMO receiver obtains a set of P received symbols from the P pilot subbands for each different combination of receive antenna and composite pilot (block 710). The set of P received symbols for receive antenna i and composite pilot m is denoted as $\{r_{i,m}(k)\}$, or $r_{i,m}(k)$ for $k \in P_{set}$, where $P_{set}$ denotes the set of P pilot subbands. The MIMO receiver obtains R·T sets of received symbols for the R receive antennas and T composite pilots. These R·T received symbol sets may be expressed as:

$$\underline{R}(k) = \begin{bmatrix} r_{1,a}(k) & r_{1,b}(k) & \cdots & r_{1,T}(k) \\ r_{2,a}(k) & r_{2,b}(k) & \cdots & r_{2,T}(k) \\ \vdots & \vdots & \ddots & \vdots \\ r_{R,a}(k) & r_{R,b}(k) & \cdots & r_{R,T}(k) \end{bmatrix}, \text{ for } k \in P_{set}. \quad \text{Eq (20)}$$

The matrix $\underline{R}(k)$ for each pilot subband k has dimensions of R×T and contains T columns of received symbols obtained from pilot subband k for the T composite pilots. $\underline{R}(k)$ is thus similar in form to the matrix $\underline{R}$ described above in equation (14) for the single-carrier multi-antenna system.

The MIMO receiver performs a P-point IDFT (or IFFT) on the set of P received symbols $\{r_{i,m}(k)\}$ for each combination of receive antenna i and composite pilot m to derive a P-tap initial impulse response estimate $\{h_{i,m}(\tau)\}$ for that combination of receive antenna and composite pilot (block 712). The R·T initial impulse response estimates for the R receive antennas and T composite pilots may be expressed as:

$$\underline{\mathcal{H}}_{init}(\tau) = \begin{bmatrix} h_{1,a}(\tau) & h_{1,b}(\tau) & \cdots & h_{1,T}(\tau) \\ h_{2,a}(\tau) & h_{2,b}(\tau) & \cdots & h_{2,T}(\tau) \\ \vdots & \vdots & \ddots & \vdots \\ h_{R,a}(\tau) & h_{R,b}(\tau) & \cdots & h_{R,T}(\tau) \end{bmatrix}, \text{ for } \tau = 1 \ldots P. \quad \text{Eq (21)}$$

The MIMO receiver then derives least-squares impulse response estimates for the individual SISO channels of the MIMO channel (block 714), as follows:

$$\underline{H}_{mimo}^{ls}(\tau) = \underline{H}_{init}(\tau) \cdot \underline{G}^{-1} \cdot \underline{U}^{-1}, \text{ for } \tau = 1 \ldots P. \quad \text{Eq (22)}$$

From equation (22), the MIMO receiver obtains R·T least-squares impulse response estimates $\{h_{i,j}^{ls}(\tau)\}$, for $i = 1 \ldots R$ and $j = 1 \ldots T$. Each least-squares impulse response estimate $\{h_{i,j}^{ls}(\tau)\}$ contains P channel taps that may be post-processed by performing thresholding and/or truncation (block 716). Each post-processed impulse response estimate or sequence is then zero-padded to length K (block 718). The MIMO receiver then performs a K-point DFT (or FFT) on each zero-padded sequence to obtain a final frequency response estimate $\{\hat{h}_{i,j}(k)\}$ for one SISO channel (block 720). $\{\hat{h}_{i,j}(k)\}$ contains K channel gain estimates for the K total subbands of the SISO channel between transmit antenna j and receive antenna i.

Alternatively, the MIMO receiver may derive an initial frequency response estimate $\underline{\hat{H}}_{init}(k)$ for each pilot subband, as follows:

$$\underline{\hat{H}}_{init}(k) = \underline{R}(k) \cdot \underline{G}^{-1} \cdot \underline{U}^{-1}, \text{ for } k \in P_{set}. \quad \text{Eq (23)}$$

The initial frequency response estimates for the P pilot subbands may be represented by a block-structured matrix $\underline{\hat{H}}_{init} = [\underline{\hat{H}}_{init}(k_1) \ \underline{\hat{H}}_{init}(k_2) \ldots \underline{\hat{H}}_{init}(k_P)]$. Each element in the front dimension of $\underline{\hat{H}}_{init}$ represents an initial frequency response estimate for the P pilot subbands of one SISO channel. The MIMO receiver then processes each initial frequency response estimate (e.g., in the same manner described above for $\underline{h}_{miso}^{init}$) to derive a final frequency response estimate for all K subbands of the SISO channel.

The MIMO receiver may thus perform matrix multiplication with $\underline{G}^{-1} \cdot \underline{U}^{-1}$ on the time-domain channel taps, as shown in equation (22), or on the frequency-domain received symbols, as shown in equation (23), to obtain channel estimates for the individual SISO channels. The time-domain processing in equation (22) is more suitable for pilot transmission schemes that transmit the T composite pilots on different sets of pilot subbands.

The MIMO receiver may perform filtering on the received symbols $\{r_{i,m}(k)\}$, the initial impulse response estimates $\{h_{i,m}(\tau)\}$, the least-squares impulse response estimates $\{h_{i,j}^{ls}(\tau)\}$, and/or the final frequency response estimates $\{\hat{h}_{i,j}(k)\}$. The filtering is typically performed separately for each subband k or tap index τ and also for the same index pair (i, m) or (i, j).

The MISO and MIMO receivers may also derive the final frequency response estimates based on other forms of interpolation instead of the least-squares estimation technique.

3. Diversity

The transmitter may transmit the pilot in a manner to achieve diversity. For a multi-antenna OFDM system, the transmitter may generate each composite pilot as follows:

$$\underline{x}_m(k) = \underline{B}(k) \cdot \underline{U} \cdot \underline{g}_m, \text{ for } k \in P_{set}, \qquad \text{Eq (24)}$$

where $\underline{B}(k)$ is a T×T diagonal matrix having the following form:

$$\underline{B}(k) = \begin{bmatrix} b_1(k) & 0 & \cdots & 0 \\ 0 & b_2(k) & \cdots & 0 \\ \vdots & \vdots & \ddots & \vdots \\ 0 & 0 & \cdots & b_T(k) \end{bmatrix}, \qquad \text{Eq (25)}$$

where $b_j(k)$ is a weight for subband k of transmit antenna j. The weight $b_j(k)$ may be defined as:

$$b_j(k) = e^{j\frac{2\pi \cdot (k-1) \cdot D_j}{K}}, \text{ for } j = 1 \ldots T \text{ and } k = 1 \ldots K, \qquad \text{Eq (26)}$$

where $D_j$ is the delay for transmit antenna j.

The weights shown in equation (26) correspond to a progressive phase shift across the K total subbands of each transmit antenna. The phase shift changes at different rates for the T transmit antennas. These weights effectively form a different beam from the T transmit antennas for each subband, which provides diversity. The spatial processing shown in equation (26) may equivalently be performed in the time domain by (1) performing a K-point IDFT on K symbols to be sent on the K subbands of each transmit antenna j to obtain K time-domain samples for that transmit antenna and (2) circularly delaying (or cyclically shifting) the K time-domain samples for each transmit antenna j by a delay of $D_j$. The delay for each transmit antenna may be selected as, for example, $D_j = \Delta D \cdot (j-1)$, for j=1 ... T, where ΔD may be equal to one sample period, a fraction of a sample period, or more than one sample period. The time-domain samples for each antenna are thus circularly delayed by a different amount. The largest delay for all T transmit antennas should be less than the channel length L.

For a single-carrier multi-antenna system, the transmitter may delay the transmit symbol for each transmit antenna j by $D_j$. The largest delay for all T transmit antennas may be selected to be less than (e.g., a small fraction of) one symbol period.

For both single-carrier and multi-carrier multi-antenna systems, the MISO receiver may derive the composite MISO channel estimate in the manner described above. However, the channel impulse response observed by the MISO receiver for each transmit antenna j is circularly delayed by $D_j$ due to the diversity processing by the transmitter. The impulse response of the composite MISO channel observed is then $h_{miso}(\tau) = h_1(\tau - D_1) + h_2(\tau - D_2) + \ldots + h_T(\tau - D_T)$ and comprises T circularly delayed channel impulse responses for the T transmit antennas. If data is transmitted in the same manner as pilot, which is normally the case, then the composite MISO channel estimate obtained by the MISO receiver is suitable for data detection.

The MIMO receiver may derive the individual SISO channel estimates in the manner described above. However, the impulse response for each SISO channel of each transmit antenna j is circularly delayed by $D_j$, which is introduced by the transmitter for that transmit antenna. The MIMO receiver thus observes channel impulse responses of $\{h_{i,j}(\tau - D_j)\}$ for i=1 ... R and j=1 ... T for the SISO channels. The MIMO receiver may cyclically shift each of the R SISO channel impulse response estimates for each transmit antenna j by the delay $D_j$ for that transmit antenna. The MIMO receiver is thus able to properly align the R·T impulse response estimates for the R·T SISO channels between the T transmit antennas and the R receive antennas. If data and pilot are both sent from each transmit antenna j with the delay of $D_j$, then the MIMO receiver does not need to cyclically shift each SISO channel impulse response estimate. In general, the channel estimation is performed in a manner consistent with the data transmission.

4. System

Figure 8:
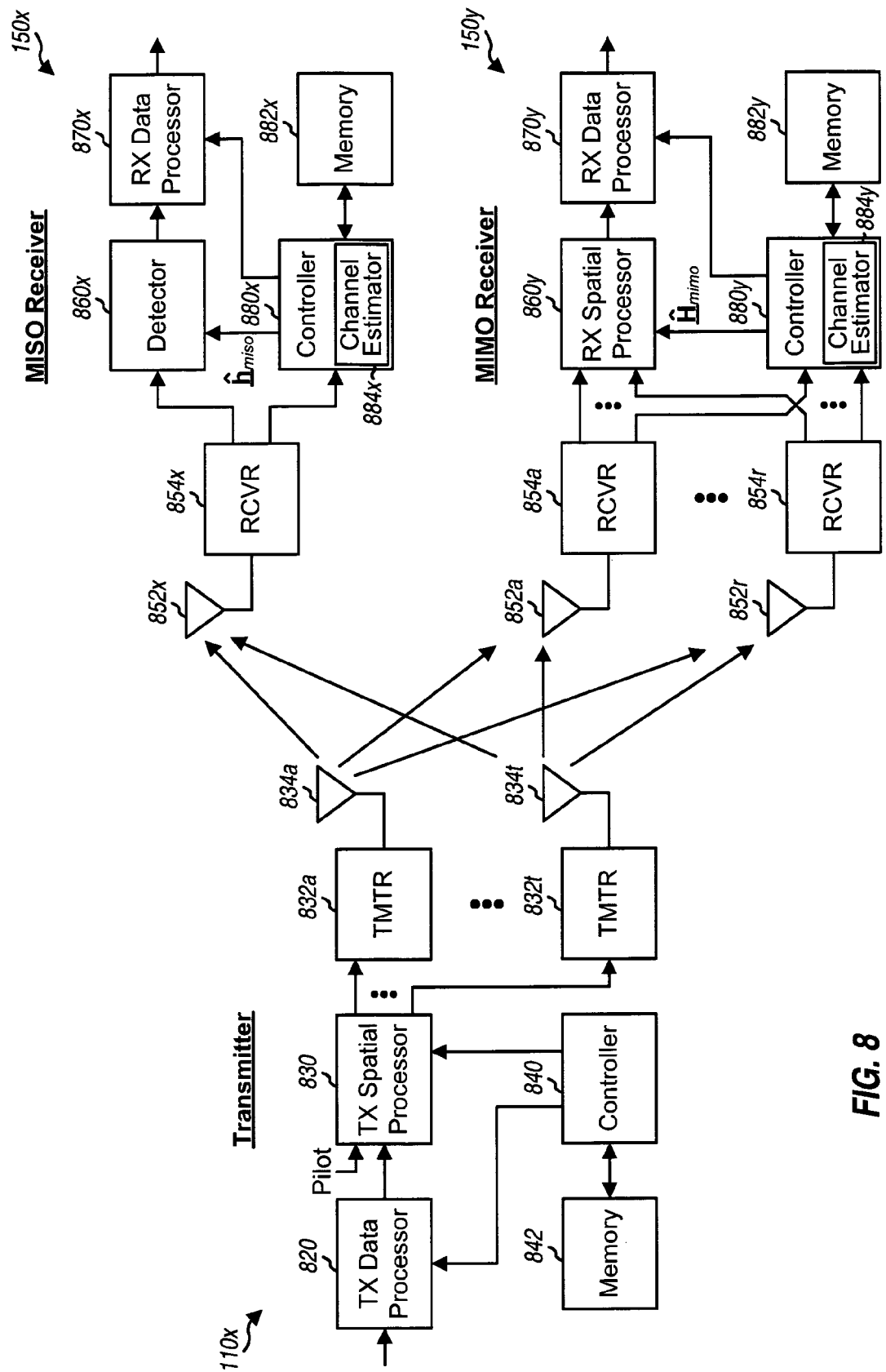
FIG. 8 shows a block diagram of the transmitter, the MISO receiver, and the MIMO receiver.

FIG. 8 shows a block diagram of a transmitter 110x, a MISO receiver 150x, and a MIMO receiver 150y in the multi-antenna OFDM system. At transmitter 110x, a TX data processor 820 receives, encodes, interleaves, and symbol maps (or modulates) traffic data and provides data symbols {s(k)}. Each data symbol is a modulation symbol for data. A TX spatial processor 830 receives and spatially processes the data symbols, generates the composite pilots, multiplexes the data symbols with the transmit symbols for the composite pilots, and provides T streams of output symbols to T transmitter units (TMTR) 832a through 832t. Each output symbol may be for data or pilot and is sent on one subband of one transmit antenna in one OFDM symbol period. Each transmitter unit 832 processes its output symbol stream and generates a modulated signal. T transmitter units 832a through 832t provide T modulated signals for transmission from T antennas 834a through 834t, respectively.

At MISO receiver 150x, an antenna 852x receives the T modulated signals from transmitter 110x and provides a received signal to a receiver unit (RCVR) 854x. Receiver unit 854x performs processing complementary to that performed by transmitter units 832 and provides (1) received data symbols to a detector 860x and (2) received pilot symbols to a channel estimator 884x within a controller 880x. Channel estimator 884x performs channel estimation for the MISO receiver and provides a composite MISO channel response estimate $\hat{h}_{miso}$. Detector 860x performs detection (e.g., matched filtering and/or equalization) on the received data symbols with the composite MISO channel estimate and provides detected symbols, which are estimates of the data symbols sent by transmitter 110x. A receive (RX) data processor 870x then symbol demaps, deinterleaves, and decodes the detected symbols and provides decoded data, which is an estimate of the transmitted traffic data.

At MIMO receiver 150y, R antennas 852a through 852r receive the T modulated signals from transmitter 110x, and each antenna 852 provides a received signal to a respective receiver unit 854. Each receiver unit 854 performs processing complementary to that performed by transmitter units 832 and provides (1) received data symbols to an RX spatial processor 860y and (2) received pilot symbols to a channel estimator 884y within a controller 880y. Channel estimator 884y performs channel estimation for the MIMO receiver and provides a MIMO channel response estimate $\hat{H}_{mimo}$. RX spatial processor 860y performs spatial processing on R received data symbol streams from R receiver units 854a through 854r with the MIMO channel response estimate and provides detected symbols. An RX data processor 870y symbol demaps, deinterleaves, and decodes the detected symbols and provides decoded data.

Controllers 840, 880x, and 880y control the operation of various processing units at transmitter 110x, MISO receiver 150x, and MIMO receiver 150y, respectively. Memory units 842, 882x, and 882y store data and/or program codes used by controllers 840, 880x, and 880y, respectively.

Figure 9:
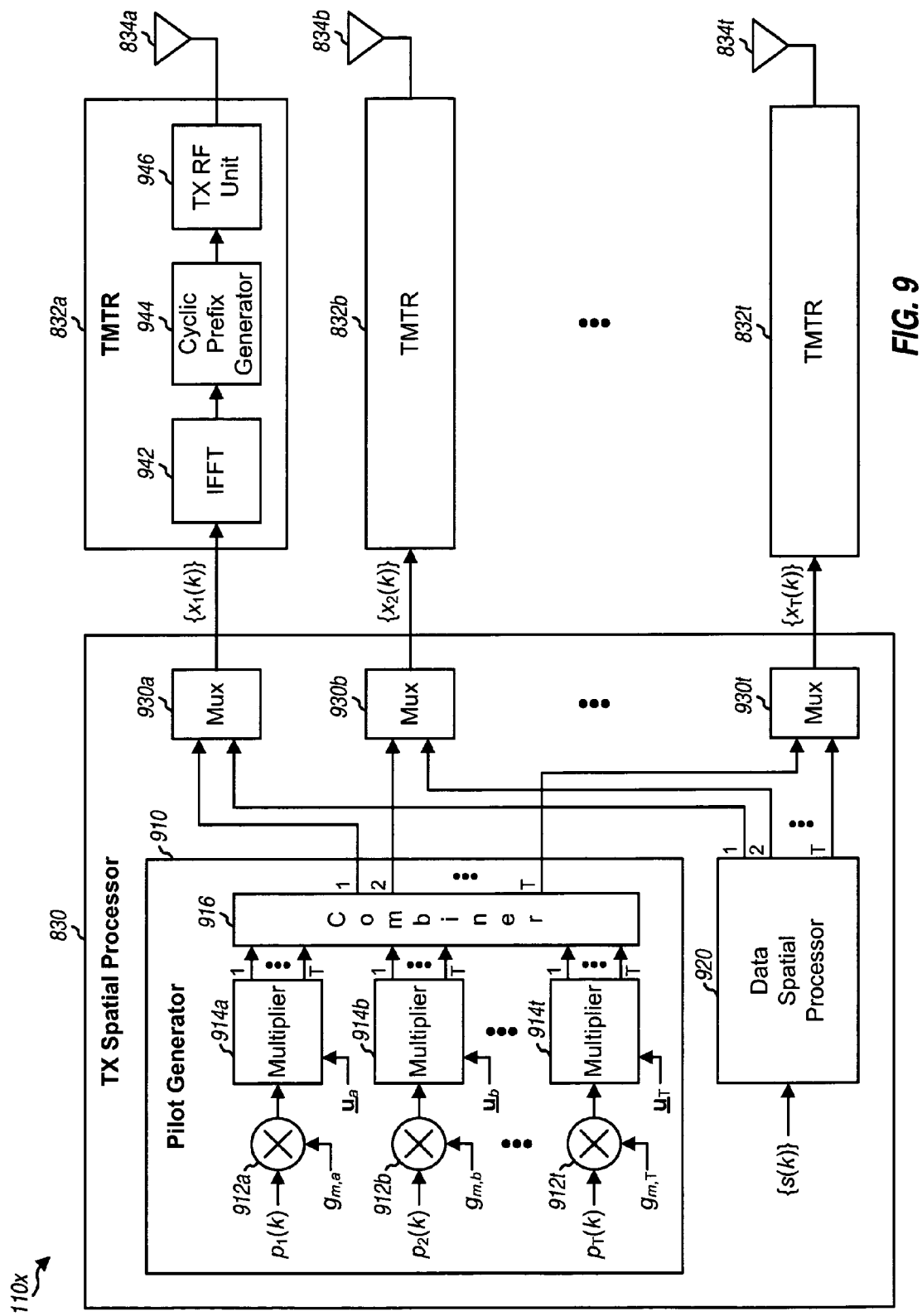
FIG. 9 shows a block diagram of a transmit (TX) spatial processor and a transmitter unit at the transmitter.

FIG. 9 shows a block diagram of an embodiment of TX spatial processor 830 and transmitter units 832 at transmitter 110x. TX spatial processor 830 includes a pilot generator 910, a data spatial processor 920, and T multiplexers (Mux) 930a through 930t for the T transmit antennas.

Pilot generator 910 generates the T composite pilots for the MISO and MIMO receivers. To generate composite pilot m for pilot subband k, T scalar multipliers 912a through 912t multiply T pilot symbols $p_a(k)$ through $p_T(k)$ for the T training pilots with T gains $g_{m,a}$ through $g_{m,T}$, respectively, in the gain vector $g_m$. T vector multipliers 914a through 914t then multiply the T scaled pilot symbols from T multipliers 912a through 912t with T training vectors $u_a$ through $u_T$, respectively, in the matrix U. A combiner 916 receives and sums the T vectors from multipliers 914a through 914t and generates a transmit symbol vector $x_m(k)$ for composite pilot m on pilot subband k. In general, the same or different pilot symbols may be used for the T training pilots. The same or different pilot symbols, the same or different gain vectors, and the same or different training matrices may be used for the pilot subbands.

Data spatial processor 920 receives the data symbols $\{s(k)\}$ from TX data processor 820 and performs spatial processing on these data symbols. For example, data spatial processor 920 may demultiplex the data symbols into T substreams for the T transmit antennas. Data spatial processor 920 may or may not perform additional spatial processing on these substreams, depending on the system design. Each multiplexer 930 receives a respective data symbol substream from data spatial processor 920 and the transmit symbols for its associated transmit antenna j, multiplexes the data symbols with the transmit symbols, and provides an output symbol stream.

Each transmitter unit 832 receives and processes a respective output symbol stream. Within each transmitter unit 832, an IFFT unit 942 transforms each set of K output symbols for the K total subbands to the time domain using a K-point IFFT and provides a transformed symbol that contains K time-domain chips. A cyclic prefix generator 944 repeats a portion of each transformed symbol to form an OFDM symbol that contains K+C chips, where C is the number of chips repeated. The repeated portion is called a cyclic prefix and is used to combat delay spread in the wireless channel. A TX radio frequency (RF) unit 946 converts the OFDM symbol stream into one or more analog signals and further amplifies, filters, and frequency upconverts the analog signal(s) to generate a modulated signal that is transmitted from an associated antenna 834. Cyclic prefix generator 944 and/or TX RF unit 946 may also provide the cyclic delay for its transmit antenna.

Figure 10A:
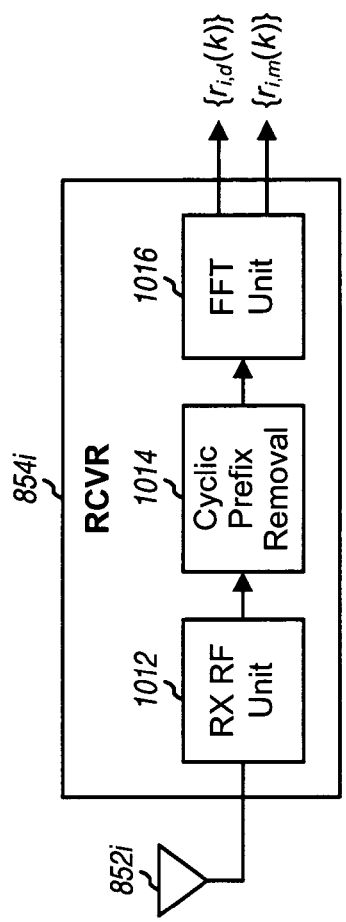
FIGS. 10A and 10B show block diagrams of a receiver unit and a channel estimator, respectively, for the MIMO receiver.

FIG. 10A shows a block diagram of an embodiment of a receiver unit 854i, which may be used for each receiver unit at MISO receiver 150x and MIMO receiver 150y. Within receiver unit 854i, an RX RF unit 1012 conditions (e.g., filters, amplifies, and frequency downconverts) the received signal from an associated antenna 852i, digitizes the conditioned signal, and provides a stream of samples. A cyclic prefix removal unit 1014 removes the cyclic prefix appended to each OFDM symbol and provides a received transformed symbol. An FFT unit 1016 transforms the K samples for each received transformed symbol to the frequency domain using a K-point FFT and obtains K received symbols for the K total subbands. For MISO receiver 150x, FFT unit 1016 provides received data symbols for the data subbands to detector 860x and received pilot symbols for the pilot subbands to channel estimator 884x. For MIMO receiver 150y, FFT unit 1016 provides received data symbols to RX spatial processor 860y and received pilot symbols to channel estimator 884y.

Figure 10B:
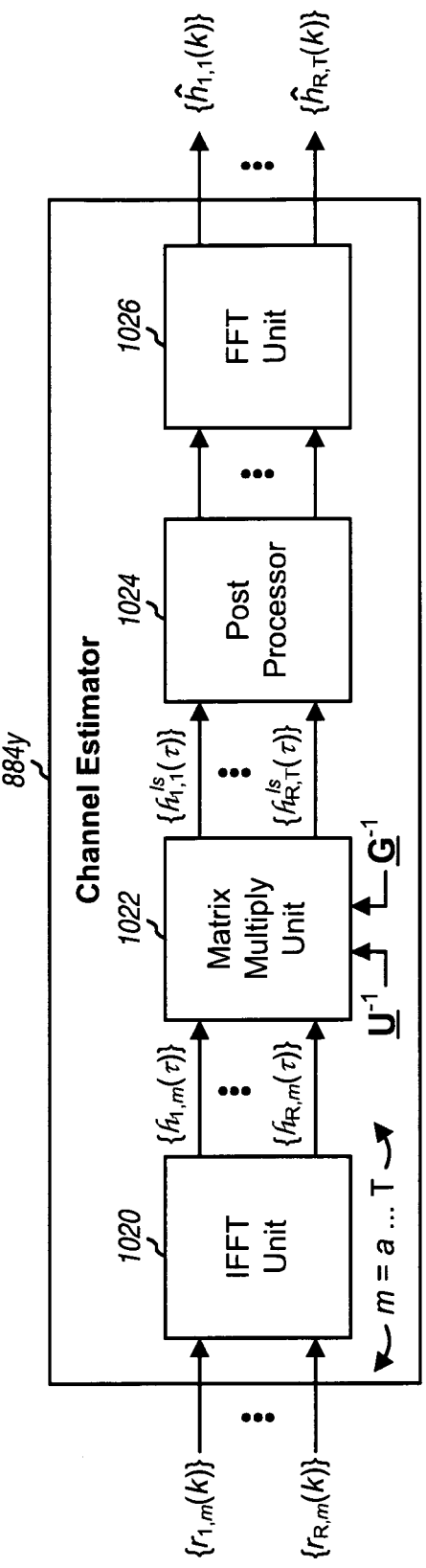

FIG. 10B shows an embodiment of channel estimator 884y for MIMO receiver 150y, which implements the direct least-squares estimation technique. Within channel estimator 884y, an FFT unit 1020 obtains a set of received pilot symbols $\{r_{i,m}(k)\}$ for each combination of receive antenna i and composite pilot m and performs a P-point IFFT on the received symbol set to obtain an initial impulse response estimate $\{h_{i,m}(\tau)\}$ for that combination of receive antenna and composite pilot. A matrix multiply unit 1022 receives R·T initial impulse response estimates for the R receive antennas and T composite pilots, multiplies these R·T initial impulse response estimates with matrices $U^{-1}$ and $G^{-1}$ for each channel tap as shown in equation (22), and provides R·T least-squares impulse response estimates for the R·T SISO channels of the MIMO channel. A post-processor 1024 may perform thresholding and/or truncation and further performs zero-padding for each least-squares impulse response estimate $\{h_{i,j}^{ls}(\tau)\}$. An FFT unit 1026 performs a K-point FFT on each zero-padded impulse response estimate and provides a corresponding final channel frequency response estimate $\{\hat{h}_{i,j}(k)\}$. Channel estimator 884y may perform filtering on $\{r_{i,m}(k)\}$, $\{h_{i,m}(\tau)\}$, $\{h_{i,j}^{ls}(\tau)\}$, and/or $\{\hat{h}_{i,j}(k)\}$. Channel estimator 884y provides the final frequency response estimates for all SISO channels to RX spatial processor 860y. RX spatial processor 860y uses these channel estimates for spatial processing of the received data symbols to obtain detected symbols $\{\hat{s}(k)\}$, which are estimates of the transmitted data symbols $\{s(k)\}$.

The pilot transmission and channel estimation techniques described herein may be used for various OFDM-based systems. One such system is an Orthogonal Frequency Division Multiple Access (OFDMA) communication system that utilizes OFDM and can support multiple users simultaneously. An OFDM-based system may also utilize frequency hopping so that data is transmitted on different subbands in different time intervals, which are also referred to as hop periods. For each user, the particular subband(s) to use for data transmission in each hop period may be determined, for example, by a pseudo-random frequency hopping sequence assigned to that user. For a frequency hopping OFDM system, pilot and data may be sent on different subbands. Each user may need to estimate the full MISO or MIMO channel response (e.g., for all K subbands) even though only one or a small subset of the K subbands is used for data transmission.

The pilot transmission and channel estimation techniques described herein may be implemented by various means. For example, the processing for pilot transmission and channel estimation may be implemented in hardware, software, or a combination thereof. For a hardware implementation, the processing units used for pilot transmission at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used for channel estimation at a receiver may also be implemented within one or more ASICs, DSPs, and so on.

For a software implementation, the processing described herein may be implemented with modules (e.g., procedures, functions, and so on) that perform the functions described herein. The software codes may be stored in a memory unit (e.g., memory units 842, 882$x$, and 882$y$ in FIG. 8) and executed by a processor (e.g., controllers 840, 880$x$, and 880$y$). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting a pilot in a wireless communication system, comprising:
    generating a plurality of composite pilots with a first matrix and a second matrix, each composite pilot comprising a plurality of training pilots generated with a plurality of orthogonal columns of the first matrix and scaled with a plurality of gain elements in a column of the second matrix; and
    transmitting each of the plurality of composite pilots via a plurality of transmit antennas,
    wherein the plurality of gain elements of the second matrix are used with the first matrix to estimate a multiple-input single-output channel.

2. The method of claim 1, wherein the generating the plurality of composite pilots comprises, for each composite pilot, generating the plurality of training pilots with the plurality of columns of the first matrix, scaling the plurality of training pilots with the plurality of gain elements in one column of the second matrix, and combining the plurality of scaled training pilots to generate the composite pilot.

3. The method of claim 1, wherein the generating the plurality of composite pilots comprises generating the plurality of composite pilots such that, for each composite pilot, one training pilot among the plurality of training pilots is transmitted at unit power and each remaining training pilot is transmitted at less than unit power.

4. The method of claim 1, further comprising:
    forming the first matrix with an orthonormal matrix having a plurality of orthogonal columns.

5. The method of claim 1, further comprising:
    forming the first matrix with a Walsh matrix or a Fourier matrix.

6. The method of claim 1, further comprising:
    forming the second matrix based on a gain value and an orthonormal matrix having a plurality of orthogonal columns.

7. The method of claim 1, further comprising:
    forming the second matrix based on a gain value and a Walsh matrix or a Fourier matrix.

8. The method of claim 1, further comprising:
    delaying pilot transmission from each of the plurality of transmit antennas by a delay selected for the transmit antenna.

9. The method of claim 3, wherein said one training pilot is used to estimate the multiple-input single-output channel and said each remaining training pilot are used to estimate a multiple-input multiple-output channel.

10. A method of transmitting a pilot in a wireless communication system, comprising:
    generating a plurality of composite pilots with a first matrix and a second matrix, each composite pilot comprising a plurality of training pilots generated with a plurality of orthogonal columns of the first matrix and scaled with a plurality of gain elements in a column of the second matrix; and
    transmitting each of the plurality of composite pilots via a plurality of transmit antennas,
    wherein the generating the plurality of composite pilots comprises generating the plurality of composite pilots with the first matrix, the second matrix, and a plurality of third matrices for a plurality of frequency subbands, the plurality of third matrices providing diversity for the plurality of composite pilots.

11. A method of transmitting a pilot in a wireless communication system, comprising:
    generating a plurality of composite pilots with a first matrix and a second matrix, each composite pilot comprising a plurality of training pilots generated with a plurality of orthogonal columns of the first matrix and scaled with a plurality of gain elements in a column of the second matrix; and
    transmitting each of the plurality of composite pilots via a plurality of transmit antennas,
    wherein the transmitting each of the plurality of composite pilots comprises transmitting each composite pilot in a different symbol period and via the plurality of transmit antennas.

12. A method of transmitting a pilot in a wireless communication system, comprising:
    generating a plurality of composite pilots with a first matrix and a second matrix, each composite pilot comprising a plurality of training pilots generated with a plurality of orthogonal columns of the first matrix and scaled with a plurality of gain elements in a column of the second matrix; and
    transmitting each of the plurality of composite pilots via a plurality of transmit antennas,
    wherein the transmitting each of the plurality of composite pilots comprises transmitting each composite pilot on a plurality of frequency subbands and via the plurality of transmit antennas.

13. A method of transmitting a pilot in a wireless communication system, comprising:
    generating a first composite pilot with a training matrix and a first gain vector, the first composite pilot comprising a plurality of training pilots generated with a plurality of orthogonal columns of the training matrix and scaled with a plurality of gain elements in the first gain vector;

selectively generating at least one additional composite pilot with the training matrix and at least one additional gain vector; and transmitting the first composite pilot and the at least one additional composite pilot, if generated, via a plurality of transmit antennas, wherein the plurality of gain elements of the first gain vector and the at least one additional gain vector, if selectively generated, are used with the training matrix to estimate a multiple-input single-output channel.

14. The method of claim 13, wherein the selectively generating at least one additional composite pilot comprises generating the at least one additional composite pilot if at least one receiver with multiple antennas is receiving the pilot.

15. An apparatus in a wireless communication system, comprising:

a pilot generator operative to generate a plurality of composite pilots with a first matrix and a second matrix, each composite pilot comprising a plurality of training pilots generated with a plurality of columns of the first matrix and scaled with a plurality of gain elements in a column of the second matrix; and a plurality of transmitter units operative to transmit each of the plurality of composite pilots via a plurality of transmit antennas, wherein the plurality of gain elements of the second matrix are used with the first matrix to estimate a multiple-input single-output channel.

16. The apparatus of claim 15, wherein for each composite pilot the pilot generator is operative to generate the plurality of training pilots with the plurality of columns of the first matrix, to scale the plurality of training pilots with the plurality of gain elements in one column of the second matrix, and to combine the plurality of scaled training pilots to generate the composite pilot.

17. The apparatus of claim 15, wherein the pilot generator is operative to generate the plurality of composite pilots such that, for each composite pilot, one training pilot among the plurality of training pilots is transmitted at unit power and each remaining training pilot is transmitted at less than unit power.

18. The apparatus of claim 15, wherein the plurality of transmitter units are operative to delay pilot transmission from each of the plurality of transmit antennas by a delay selected for the transmit antenna.

19. The apparatus of claim 15, wherein the first and second matrices are each formed based on an orthonormal matrix having a plurality of orthogonal columns.

20. An apparatus in a wireless communication system, comprising:

means for generating a plurality of composite pilots with a first matrix and a second matrix, each composite pilot comprising a plurality of training pilots generated with a plurality of orthogonal columns of the first matrix and scaled with a plurality of gain elements in a column of the second matrix; and means for transmitting each of the plurality of composite pilots via a plurality of transmit antennas, wherein the plurality of gain elements of the second matrix are used with the first matrix to estimate a multiple-input single-output channel.

21. The apparatus of claim 20, wherein the means for generating the plurality of composite pilots comprises, for each composite pilot, means for generating the plurality of training pilots with the plurality of columns of the first matrix, means for scaling the plurality of training pilots with the plurality of gain elements in one column of the second matrix, and means for combining the plurality of scaled training pilots to generate the composite pilot.

22. The apparatus of claim 20, wherein the means for generating the plurality of composite pilots comprises, means for generating the plurality of composite pilots such that, for each composite pilot, one training pilot among the plurality of training pilots is transmitted at unit power and each remaining training pilot is transmitted at less than unit power.

23. A method of performing channel estimation in a wireless communication system, comprising:

obtaining, via a single receive antenna, received symbols for a plurality of composite pilots transmitted via a plurality of transmit antennas, each composite pilot comprising a plurality of training pilots generated with a plurality of orthogonal columns of a first matrix and scaled with a plurality of gain elements in a column of a second matrix; and processing the received symbols to obtain an estimate of a multiple-input single-output (MISO) channel between the plurality of transmit antennas and the single receive antenna, wherein the plurality of gain elements of the second matrix are used with the first matrix to estimate the multiple-input single-output channel.

24. A method of performing channel estimation in a wireless communication system, comprising:

obtaining, via a single receive antenna, received symbols for a plurality of composite pilots transmitted via a plurality of transmit antennas, each composite pilot comprising a plurality of training pilots generated with a plurality of orthogonal columns of a first matrix and scaled with a plurality of gain elements in a column of a second matrix; and processing the received symbols to obtain an estimate of a multiple-input single-output (MISO) channel between the plurality of transmit antennas and the single receive antenna, wherein the processing the received symbols comprises filtering the received symbols to obtain the estimate of the MISO channel.

25. A method of performing channel estimation in a wireless communication system, comprising:

obtaining, via a single receive antenna, received symbols for a plurality of composite pilots transmitted via a plurality of transmit antennas, each composite pilot comprising a plurality of training pilots generated with a plurality of orthogonal columns of a first matrix and scaled with a plurality of gain elements in a column of a second matrix; and processing the received symbols to obtain an estimate of a multiple-input single-output (MISO) channel between the plurality of transmit antennas and the single receive antenna, wherein the processing the received symbols comprises deriving a plurality of initial impulse response estimates for the plurality of composite pilots based on the received symbols, and filtering the plurality of initial impulse response estimates to obtain an impulse response estimate for the MISO channel.

26. The method of claim 25, wherein the processing the received symbols further comprises retaining first L channel taps in the impulse response estimate for the MISO channel, where L is an integer greater than one, and setting remaining channel taps in the impulse response estimate for the MISO channel to zeros.

27. The method of claim 25, wherein the processing the received symbols further comprises setting channel taps in the impulse response estimate for the MISO channel with magnitudes below a predetermined threshold to zeros.

28. The method of claim 25, wherein the processing the received symbols further comprises deriving a frequency response estimate for the MISO channel based on the impulse response estimate for the MISO channel.

29. An apparatus in a wireless communication system, comprising:
    a receiver unit operative to provide received symbols for a plurality of composite pilots transmitted from a plurality of transmit antennas to a single receive antenna, each composite pilot comprising a plurality of training pilots generated with a plurality of orthogonal columns of a first matrix and scaled with a plurality of gain elements in a column of a second matrix; and
    a channel estimator operative to process the received symbols to obtain an estimate of a multiple-input single-output (MISO) channel between the plurality of transmit antennas and the single receive antenna,
    wherein the plurality of gain elements of the second matrix are used with the first matrix to estimate the multiple-input single-output channel.

30. An apparatus in a wireless communication system, comprising:
    a receiver unit operative to provide received symbols for a plurality of composite pilots transmitted from a plurality of transmit antennas to a single receive antenna, each composite pilot comprising a plurality of training pilots generated with a plurality of orthogonal columns of a first matrix and scaled with a plurality of gain elements in a column of a second matrix; and
    a channel estimator operative to process the received symbols to obtain an estimate of a multiple-input single-output (MISO) channel between the plurality of transmit antennas and the single receive antenna,
    wherein the channel estimator is operative to filter the received symbols to obtain the estimate of the MISO channel.

31. An apparatus in a wireless communication system, comprising:
    a receiver unit operative to provide received symbols for a plurality of composite pilots transmitted from a plurality of transmit antennas to a single receive antenna, each composite pilot comprising a plurality of training pilots generated with a plurality of orthogonal columns of a first matrix and scaled with a plurality of gain elements in a column of a second matrix; and
    a channel estimator operative to process the received symbols to obtain an estimate of a multiple-input single-output (MISO) channel between the plurality of transmit antennas and the single receive antenna,
    wherein the channel estimator is operative to derive a plurality of initial impulse response estimates for the plurality of composite pilots based on the received symbols and to filter the plurality of initial impulse response estimates to obtain an impulse response estimate for the MISO channel.

32. An apparatus in a wireless communication system, comprising:
    means for obtaining, via a single receive antenna, received symbols for a plurality of composite pilots transmitted via a plurality of transmit antennas, each composite pilot comprising a plurality of training pilots generated with a plurality of orthogonal columns of a first matrix and scaled with a plurality of gain elements in a column of a second matrix; and
    means for processing the received symbols to obtain an estimate of a multiple-input single-output (MISO) channel between the plurality of transmit antennas and the single receive antenna,
    wherein the plurality of gain elements of the second matrix are used with the first matrix to estimate the multiple-input single-output channel.

33. An apparatus in a wireless communication system, comprising:
    means for obtaining, via a single receive antenna, received symbols for a plurality of composite pilots transmitted via a plurality of transmit antennas, each composite pilot comprising a plurality of training pilots generated with a plurality of orthogonal columns of a first matrix and scaled with a plurality of gain elements in a column of a second matrix; and
    means for processing the received symbols to obtain an estimate of a multiple-input single-output (MISO) channel between the plurality of transmit antennas and the single receive antenna,
    wherein the means for processing the received symbols comprises means for filtering the received symbols to obtain the estimate of the MISO channel.

34. An apparatus in a wireless communication system, comprising:
    means for obtaining, via a single receive antenna, received symbols for a plurality of composite pilots transmitted via a plurality of transmit antennas, each composite pilot comprising a plurality of training pilots generated with a plurality of orthogonal columns of a first matrix and scaled with a plurality of gain elements in a column of a second matrix; and
    means for processing the received symbols to obtain an estimate of a multiple-input single-output (MISO) channel between the plurality of transmit antennas and the single receive antenna,
    wherein the means for processing the received symbols comprises means for deriving a plurality of initial impulse response estimates for the plurality of composite pilots based on the received symbols, and means for filtering the plurality of initial impulse response estimates to obtain an impulse response estimate for the MISO channel.

35. A method of performing channel estimation in a wireless communication system, comprising:
    obtaining, via a plurality of receive antennas, received symbols for a plurality of composite pilots transmitted via a plurality of transmit antennas, each composite pilot comprising a plurality of training pilots generated with a plurality of orthogonal columns of a first matrix and scaled with a plurality of gain elements in a column of a second matrix; and
    processing the received symbols based on the first and second matrices to obtain estimates of a plurality of single-input single-output (SISO) channels between the plurality of transmit antennas and the plurality of receive antennas,
    wherein the plurality of gain elements of the second matrix are used with the first matrix to estimate a multiple-input single-output channel.

36. The method of claim 35, wherein the processing the received symbols comprises performing matrix multiply on the received symbols based on the first and second matrices to obtain estimates of the plurality of SISO channels.

37. The method of claim 35, wherein the processing the received symbols comprises deriving a plurality of initial impulse response estimates for a plurality of combinations of composite pilot and receive antenna based on the received symbols, and processing the plurality of initial impulse response estimates based on the first and second matrices to obtain a plurality of intermediate impulse response estimates for the plurality of SISO channels.

38. The method of claim 37, wherein the processing the received symbols further comprises retaining first L channel taps in each of the plurality of intermediate impulse response estimates, where L is an integer greater than one, and setting remaining channel taps in each of the plurality of intermediate impulse response estimates to zeros.

39. The method of claim 37, wherein the processing the received symbols further comprises setting channel taps in each of the plurality of intermediate impulse response estimates with magnitudes below a predetermined threshold to zeros.

40. A method of performing channel estimation in a wireless communication system, comprising:
obtaining, via a plurality of receive antennas, received symbols for a plurality of composite pilots transmitted via a plurality of transmit antennas, each composite pilot comprising a plurality of training pilots generated with a plurality of orthogonal columns of a first matrix and scaled with a plurality of gain elements in a column of a second matrix; and
processing the received symbols based on the first and second matrices to obtain estimates of a plurality of single-input single-output (SISO) channels between the plurality of transmit antennas and the plurality of receive antennas,
wherein the processing the received symbols comprises deriving a plurality of initial impulse response estimates for a plurality of combinations of composite pilot and receive antenna based on the received symbols, and processing the plurality of initial impulse response estimates based on the first and second matrices to obtain a plurality of intermediate impulse response estimates for the plurality of SISO channels,
wherein the processing the received symbols further comprises delaying the plurality of intermediate impulse response estimates based on delays introduced at the plurality of transmit antennas.

41. A method of performing channel estimation in a wireless communication system, comprising:
obtaining, via a plurality of receive antennas, received symbols for a plurality of composite pilots transmitted via a plurality of transmit antennas, each composite pilot comprising a plurality of training pilots generated with a plurality of orthogonal columns of a first matrix and scaled with a plurality of gain elements in a column of a second matrix; and
processing the received symbols based on the first and second matrices to obtain estimates of a plurality of single-input single-output (SISO) channels between the plurality of transmit antennas and the plurality of receive antennas,
wherein the processing the received symbols comprises deriving a plurality of initial impulse response estimates for a plurality of combinations of composite pilot and receive antenna based on the received symbols, and processing the plurality of initial impulse response estimates based on the first and second matrices to obtain a plurality of intermediate impulse response estimates for the plurality of SISO channels,
wherein the processing the received symbols further comprises deriving a plurality of frequency response estimates for the plurality of SISO channels based on the plurality of intermediate impulse response estimates.

42. A method of performing channel estimation in a wireless communication system, comprising:
obtaining, via a plurality of receive antennas, received symbols for a plurality of composite pilots transmitted via a plurality of transmit antennas, each composite pilot comprising a plurality of training pilots generated with a plurality of orthogonal columns of a first matrix and scaled with a plurality of gain elements in a column of a second matrix; and
processing the received symbols based on the first and second matrices to obtain estimates of a plurality of single-input single-output (SISO) channels between the plurality of transmit antennas and the plurality of receive antennas,
wherein the processing the received symbols comprises processing the received symbols based on the first and second matrices to obtain a plurality of initial frequency response estimates for the plurality of SISO channels, deriving a plurality of impulse response estimates for the plurality of SISO pilots based on the plurality of initial frequency response estimates, and deriving a plurality of final frequency response estimates for the plurality of SISO channels based on the plurality of impulse response estimates.

43. An apparatus in a wireless communication system, comprising:
a plurality of receiver units operative to provide received symbols for a plurality of composite pilots transmitted from a plurality of transmit antennas to a plurality of receive antennas, each composite pilot comprising a plurality of training pilots generated with a plurality of orthogonal columns of a first matrix and scaled with a plurality of gain elements in a column of a second matrix; and
a channel estimator operative to process the received symbols based on the first and second matrices to obtain estimates of a plurality of single-input single-output (SISO) channels between the plurality of transmit antennas and the plurality of receive antennas,
wherein the plurality of gain elements of the second matrix are used with the first matrix to estimate a multiple-input single-output channel.

44. The apparatus of claim 43, wherein the channel estimator is operative to perform matrix multiply on the received symbols based on the first and second matrices to obtain estimates of the plurality of SISO channels.

45. An apparatus in a wireless communication system, comprising:
a plurality of receiver units operative to provide received symbols for a plurality of composite pilots transmitted from a plurality of transmit antennas to a plurality of receive antennas, each composite pilot comprising a plurality of training pilots generated with a plurality of orthogonal columns of a first matrix and scaled with a plurality of gain elements in a column of a second matrix; and
a channel estimator operative to process the received symbols based on the first and second matrices to obtain estimates of a plurality of single-input single-output (SISO) channels between the plurality of transmit antennas and the plurality of receive antennas,
wherein the channel estimator is operative to derive a plurality of initial impulse response estimates for a plurality of combinations of composite pilot and receive antenna based on the received symbols and to process the plurality of initial impulse response estimates based on the first and second matrices to obtain a plurality of intermediate impulse response estimates for the plurality of SISO channels.

46. An apparatus in a wireless communication system, comprising:
   means for obtaining, via a plurality of receive antennas, received symbols for a plurality of composite pilots transmitted via a plurality of transmit antennas, each composite pilot comprising a plurality of training pilots generated with a plurality of columns of a first matrix and scaled with a plurality of gain elements in a column of a second matrix; and
   means for processing the received symbols based on the first and second matrices to obtain estimates of a plurality of single-input single-output (SISO) channels between the plurality of transmit antennas and the plurality of receive antennas,
   wherein the plurality of gain elements of the second matrix are used with the first matrix to estimate a multiple-input single-output channel.

47. An apparatus in a wireless communication system, comprising:
   means for obtaining, via a plurality of receive antennas, received symbols for a plurality of composite pilots transmitted via a plurality of transmit antennas, each composite pilot comprising a plurality of training pilots generated with a plurality of columns of a first matrix and scaled with a plurality of gain elements in a column of a second matrix; and
   means for processing the received symbols based on the first and second matrices to obtain estimates of a plurality of single-input single-output (SISO) channels between the plurality of transmit antennas and the plurality of receive antennas,
   wherein the means for processing the received symbols comprises means for deriving a plurality of initial impulse response estimates for a plurality of combinations of composite pilot and receive antenna based on the received symbols, and means for processing the plurality of initial impulse response estimates based on the first and second matrices to obtain a plurality of intermediate impulse response estimates for the plurality of SISO channels.

48. A non-transitory computer-readable medium having a computer program, which when executed by at least one processor, operates to transmit a pilot in a wireless communication system, the computer program comprising:
   instructions for generating a plurality of composite pilots with a first matrix and a second matrix, each composite pilot comprising a plurality of training pilots generated with a plurality of orthogonal columns of the first matrix and scaled with a plurality of gain elements in a column of the second matrix; and
   instructions for transmitting each of the plurality of composite pilots via a plurality of transmit antennas,
   wherein the plurality of gain elements of the second matrix are used with the first matrix to estimate a multiple-input single-output channel.

49. The non-transitory computer-readable medium of claim 48, the computer program further comprising:
   instructions for forming the first matrix with an orthonormal matrix having a plurality of orthogonal columns.

50. The non-transitory computer-readable medium of claim 48, the computer program further comprising:
   instructions for forming the first matrix with a Walsh matrix or a Fourier matrix.

51. The non-transitory computer-readable medium of claim 48, the computer program further comprising:
   instructions for forming the second matrix based on a gain value and an orthonormal matrix having a plurality of orthogonal columns.

52. The non-transitory computer-readable medium of claim 48, the computer program further comprising:
   instructions for forming the second matrix based on a gain value and a Walsh matrix or a Fourier matrix.

53. The non-transitory computer-readable medium of claim 48, the computer program further comprising:
   instructions for delaying pilot transmission from each of the plurality of transmit antennas by a delay selected for the transmit antenna.

54. At least one processor configured to perform a method of transmitting a pilot in a wireless communication system, the method comprising:
   generating a plurality of composite pilots with a first matrix and a second matrix, each composite pilot comprising a plurality of training pilots generated with a plurality of orthogonal columns of the first matrix and scaled with a plurality of gain elements in a column of the second matrix; and
   transmitting each of the plurality of composite pilots via a plurality of transmit antennas,
   wherein the plurality of gain elements of the second matrix are used with the first matrix to estimate a multiple-input single-output channel.

55. The at least one processor of claim 54, the method further comprising:
   forming the first matrix with an orthonormal matrix having a plurality of orthogonal columns.

56. The at least one processor of claim 54, the method further comprising:
   forming the first matrix with a Walsh matrix or a Fourier matrix.

57. The at least one processor of claim 54, the method further comprising:
   forming the second matrix based on a gain value and an orthonormal matrix having a plurality of orthogonal columns.

58. The at least one processor of claim 54, the method further comprising:
   forming the second matrix based on a gain value and a Walsh matrix or a Fourier matrix.

59. The at least one processor of claim 54, the method further comprising:
   delaying pilot transmission from each of the plurality of transmit antennas by a delay selected for the transmit antenna.

* * * * *